United States Patent
Jayarathne et al.

(10) Patent No.: US 11,761,674 B2
(45) Date of Patent: Sep. 19, 2023

(54) CONDENSATE PAN FOR A HEAT EXCHANGER

(71) Applicant: Johnson Controls Technology Company, Auburn Hills, MI (US)

(72) Inventors: Madhuka Manuranga Jayarathne, Wichita, KS (US); Lester Dale Sherrow, Wichita, KS (US); Rakesh Mathew, Wichita, KS (US); Rohan Bhuse, Moshi (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 324 days.

(21) Appl. No.: 17/217,898

(22) Filed: Mar. 30, 2021

(65) Prior Publication Data
US 2022/0316755 A1    Oct. 6, 2022

(51) Int. Cl.
*F24F 13/22* (2006.01)
*F24F 1/0059* (2019.01)

(52) U.S. Cl.
CPC ......... *F24F 13/222* (2013.01); *F24F 1/0059* (2013.01)

(58) Field of Classification Search
CPC .... F24F 13/22; F24F 13/222; F24F 2013/227; F28F 17/005; F25D 21/14; F24H 8/006
USPC ............................................. 122/417; 432/74
See application file for complete search history.

(56) References Cited

U.S. PATENT DOCUMENTS

| | | | | |
|---|---|---|---|---|
| 5,309,890 A | * | 5/1994 | Rieke | F24H 8/006 137/247.27 |
| 5,379,749 A | * | 1/1995 | Rieke | F24H 8/006 137/247.27 |
| 5,582,159 A | * | 12/1996 | Harvey | F24H 8/006 73/714 |
| 7,370,489 B2 | | 5/2008 | Rios et al. | |
| 7,669,641 B2 | | 3/2010 | Rembold et al. | |
| 8,683,993 B2 | * | 4/2014 | Paller | F24H 9/2035 126/110 R |
| 9,038,622 B2 | * | 5/2015 | Goundiah Ramasamy | F24H 8/006 126/85 R |
| 9,074,791 B2 | * | 7/2015 | Rieke | F28F 17/005 |
| 9,261,292 B2 | * | 2/2016 | Sherrow | F24H 8/00 |
| 9,429,338 B2 | * | 8/2016 | Kowald | F23D 14/58 |
| D768,270 S | | 10/2016 | Yamamoto et al. | |
| 9,664,461 B2 | | 5/2017 | Mercer et al. | |
| 10,024,584 B1 | * | 7/2018 | Peet | F25D 31/006 |
| 10,126,013 B2 | | 11/2018 | Yamamoto | |

(Continued)

*Primary Examiner* — Ko-Wei Lin
(74) *Attorney, Agent, or Firm* — Fletcher Yoder, PC

(57) ABSTRACT

A heat exchanger (e.g., a furnace) for a heating, ventilation, and/or air conditioning (HVAC) system includes a condensate pan having a first opening defined in a surface of the condensate pan. The condensate pan is configured to receive liquid condensate via the first opening, and the first opening comprises a first cross-sectional area. The furnace further includes a pocket comprising a wall circumscribing and defining a second opening. The second opening has a second cross-sectional area greater than the first cross-sectional area of the first opening of the condensate pan. The pocket is configured to be coupled to the surface of the condensate pan such that the wall of the pocket surrounds the first opening in the surface of the condensate pan.

20 Claims, 14 Drawing Sheets

(56) References Cited

U.S. PATENT DOCUMENTS

| | | | | |
|---|---|---|---|---|
| 2005/0126558 A1* | 6/2005 | Riepenhoff | ............. | F24H 8/006 |
| | | | | 126/110 R |
| 2008/0314375 A1* | 12/2008 | Khan | ...................... | F24H 3/087 |
| | | | | 220/571 |
| 2010/0050756 A1* | 3/2010 | Stewart | ................... | F24F 13/22 |
| | | | | 73/114.55 |
| 2011/0174471 A1* | 7/2011 | Paller | ...................... | F23D 14/34 |
| | | | | 165/173 |
| 2011/0265508 A1* | 11/2011 | Piccione | ............... | F24F 13/222 |
| | | | | 29/890.035 |
| 2012/0151953 A1* | 6/2012 | Timbs | ................... | F24F 13/222 |
| | | | | 62/291 |
| 2013/0255301 A1 | 10/2013 | Correa et al. | | |
| 2013/0276471 A1* | 10/2013 | Austin | .................... | F25D 21/14 |
| | | | | 220/571 |
| 2014/0034038 A1* | 2/2014 | Sherrow | ................. | F24H 8/006 |
| | | | | 126/114 |
| 2014/0213172 A1* | 7/2014 | Jameson | ................... | F24F 7/04 |
| | | | | 454/284 |
| 2016/0123682 A1* | 5/2016 | Barbely | ................. | F24F 1/005 |
| | | | | 312/236 |
| 2016/0313049 A1* | 10/2016 | Totaro | ..................... | F25D 21/14 |
| 2017/0045259 A1* | 2/2017 | Choi | .................... | F24F 13/1426 |
| 2017/0254559 A1* | 9/2017 | Yamamoto | ............ | F24F 1/0063 |
| 2018/0094860 A1* | 4/2018 | Sakamaki | ............... | F28F 1/128 |
| 2019/0120541 A1* | 4/2019 | Yoo | ........................ | F25D 21/14 |
| 2019/0390880 A1 | 12/2019 | Montemayor et al. | | |
| 2020/0378647 A1* | 12/2020 | Bauer | ..................... | F24F 13/30 |
| 2022/0307266 A1* | 9/2022 | Chan | .................... | F24F 13/222 |

\* cited by examiner

CONDENSATE PAN FOR A HEAT EXCHANGER

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. For example, an HVAC system may include several heat exchangers, such as a heat exchanger configured to place an air flow in a heat exchange relationship with a refrigerant of a vapor compression circuit (e.g., evaporator, condenser), a heat exchanger configured to place an air flow in a heat exchange relationship with combustion products (e.g., a furnace), or both. In general, the heat exchange relationship(s) may cause a change in pressures and/or temperatures of the air, the refrigerant, the combustion products, or any combination thereof. As the temperatures and/or pressures of the above-described fluids change, liquid condensate may be formed in or on the associated heat exchangers.

A condensate drip tray may be employed in traditional embodiments for collecting condensate formed in or on the heat exchangers. Unfortunately, traditional condensate collection and drainage mechanisms may be configured in a manner that limits an efficiency of the heat exchanger, such as limiting a number of heat exchange tubes that can be used in the heat exchanger. Further, certain traditional mechanisms may be inadequate for collecting and draining the condensate, which may lead to water damage, air pressure damage, and/or related operating interruptions and inefficiencies in the heat exchanger. Accordingly, it is now recognized that improved condensate management for heat exchangers, such as a furnace, is needed.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a furnace for a heating, ventilation, and/or air conditioning (HVAC) system includes a condensate pan having a first opening defined in a surface of the condensate pan. The condensate pan is configured to receive liquid condensate via the first opening, and the first opening comprises a first cross-sectional area. The furnace further includes a pocket comprising a wall circumscribing and defining a second opening. The second opening has a second cross-sectional area greater than the first cross-sectional area of the first opening of the condensate pan. The pocket is configured to be coupled to the surface of the condensate pan such that the wall of the pocket surrounds the first opening in the surface of the condensate pan.

In another embodiment, a condensate collection assembly for a heating, ventilation, and/or air conditioning (HVAC) system includes a condensate pan having a first opening defined in a surface of the condensate pan. The condensate pan is configured to receive liquid condensate via the first opening. The condensate collection assembly further includes a pocket comprising a wall circumscribing and defining a second opening configured to receive the liquid condensate. The pocket is configured to be coupled to the surface of the condensate pan such that the wall of the pocket surrounds the first opening in the surface of the condensate pan and such that a portion of the surface of the condensate pan extends between the wall of the pocket and the first opening defined in the surface of the condensate pan.

In another embodiment, a heat exchanger for a heating, ventilation, and/or air conditioning (HVAC) system includes a condensate pan having a first opening defined in a surface of the condensate pan, wherein the condensate pan is configured to receive liquid condensate associated with heat exchange tubes of the heat exchanger via the first opening. The first opening comprises a first cross-sectional area. The heat exchanger further includes a pocket extending from the surface of the condensate pan and comprising a wall defining a second opening configured to receive the liquid condensate. The pocket has a second cross-sectional area greater than the first cross-sectional area of the condensate pan and the pocket and the condensate pan are positioned relative to each other such that the wall of the pocket surrounds the first opening in the surface of the condensate pan.

DRAWINGS

Various aspects of this disclosure may be better understood upon reading the following detailed description and upon reference to the drawings in which.

DETAILED DESCRIPTION

Figure 1:
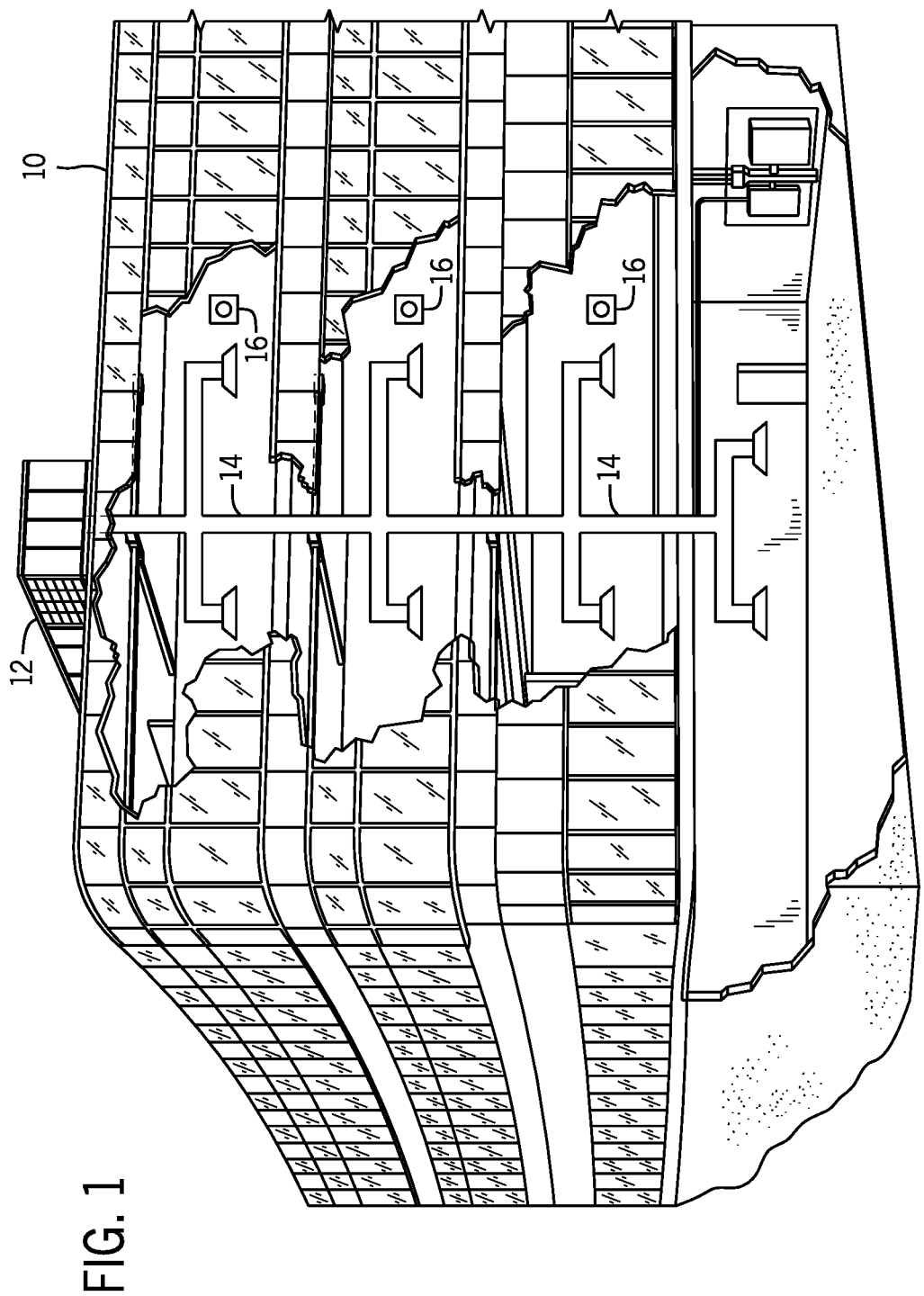
FIG. 1 is a perspective view of a building having a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a vapor compression circuit that circulates a refrigerant for conditioning a supply air flow, a combustion cycle that circulates combustion products for conditioning a supply air flow, or a combination thereof. For example, the vapor compression circuit may include at least one heat exchanger configured to receive the refrigerant. Further, at least one fan may be employed and configured to direct a supply air flow over the at least one heat exchanger. The supply air flow may then be directed into a space to condition the space. In some embodiments, the vapor compression circuit may be a heat pump that provides, via the supply air flow, both heating and cooling to the conditioned space. For example, a refrigerant flow through the vapor compression system may be reversed to change the vapor compression system from a heating mode to a cooling mode. Accordingly, in a first operating mode (e.g., heating mode) of the vapor compression system, a first heat exchanger may act as a condenser and a second heat exchanger may act as an evaporator, whereas in a second operating mode (e.g., cooling mode) of the vapor compression system, the first heat exchanger may act as an evaporator and the second heat exchanger may act as a condenser.

Additionally or alternatively, the HVAC system may include a combustion cycle employing a furnace (e.g., a condensing furnace) configured to provide a heated supply air flow to the conditioned space. For example, the furnace may include a heat exchanger having tubing that is configured to receive relatively hot combustion products (e.g., flue gas). The furnace may also include a blower configured to direct the supply air flow across the tubing, thereby placing the supply air flow in a heat exchange relationship with the relatively hot combustion products to heat the supply air flow. Thereafter, the heated supply air flow may be directed into the conditioned space.

In some circumstances, condensate may form in or on various of the above-described heat exchangers during operation of the HVAC system, such as the condensing heat exchanger of the vapor compression circuit and/or the heat exchanger of the furnace. For example, in the heat exchanger of the furnace, the relatively cool supply air flow may cause the relatively hot combustion products to cool, thereby causing moisture contained within the combustion products to condense. In traditional systems, traditional condensate management mechanisms are configured to remove at least some of the condensate from the heat exchanger before it may be released back into the system or into the environment. Unfortunately, traditional mechanisms may be configured in a manner that limits an efficiency of the corresponding heat exchanger. For example, traditional condensate pans may be sized to collect condensate from a limited area of the furnace having a limited number of tubes.

It is now recognized that improved condensate pans and related features, in accordance with the present disclosure, can enable the inclusion of additional heat exchange tubes without substantially increasing a heat exchanger (e.g., furnace) footprint, thereby increasing an efficiency of the furnace. For example, a pocket may be retrofitted to existing condensate pans to accommodate a larger condensate collection area and, in turn, more heat exchange tubes than would otherwise be possible in traditional systems. The term pocket as used herein may refer to a geometric feature that is coupled to, or integral with, the condensate pan and enhances a condensate collection area associated with the condensate pan. For example, the pocket may be a frame member (e.g., rectangular frame member) coupled to the condensate pan about an opening in the condensate pan, where an additional opening of the pocket includes a larger cross-sectional area than the opening in the condensate pan. The larger cross-sectional area of the additional opening in the pocket (e.g., relative to the smaller cross-sectional area of the opening of the condensate pan) may enhance the collection area (or volume) associated with the condensate pan. In addition to increasing a collection area and, in turn, enabling additional tubes of the heat exchanger without substantially increasing a footprint of the heat exchanger, use of the presently disclosed pocket may reduce a likelihood of water, pressure, and other damage to certain aspects of the furnace, such as electronics.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
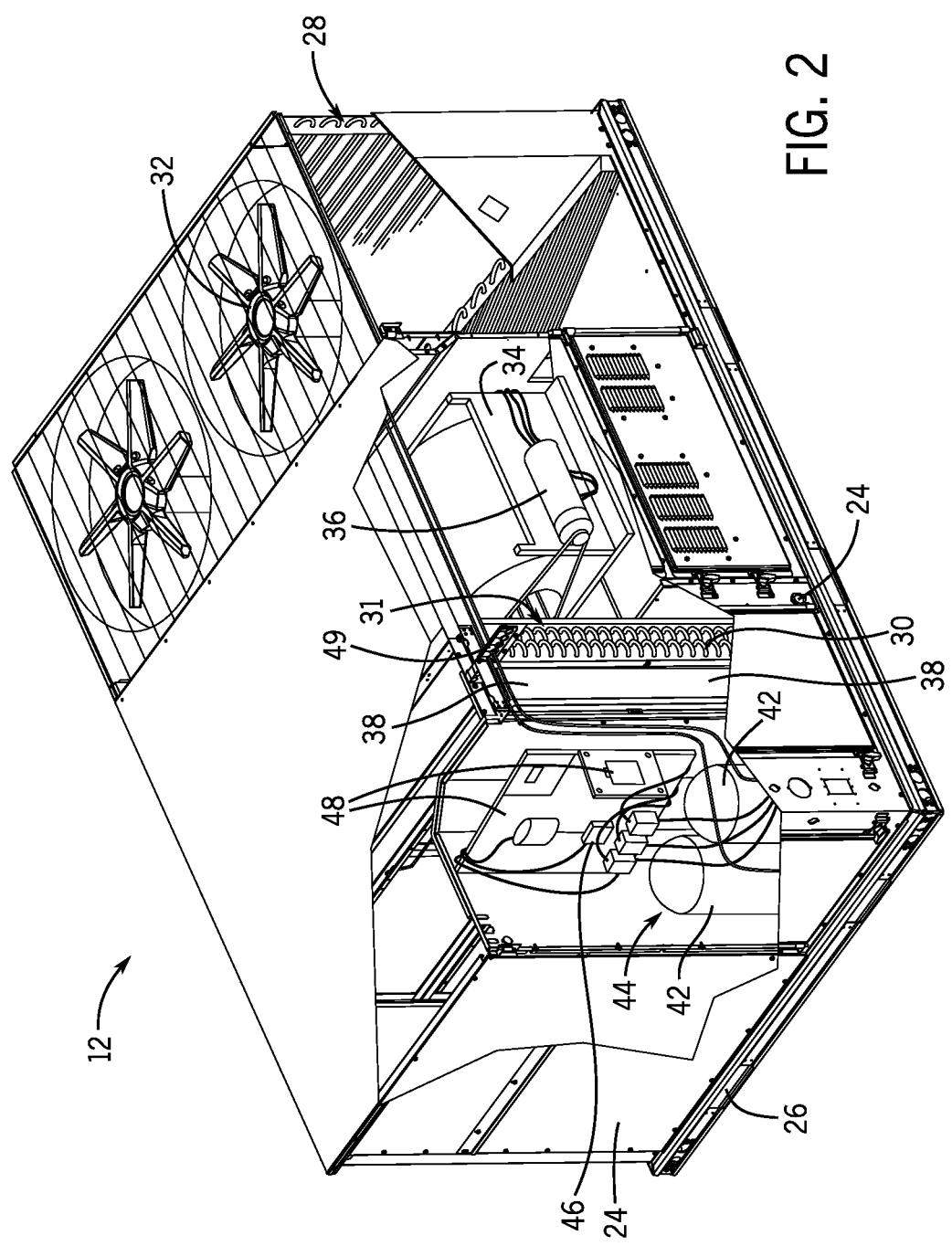
FIG. 2 is a perspective view of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
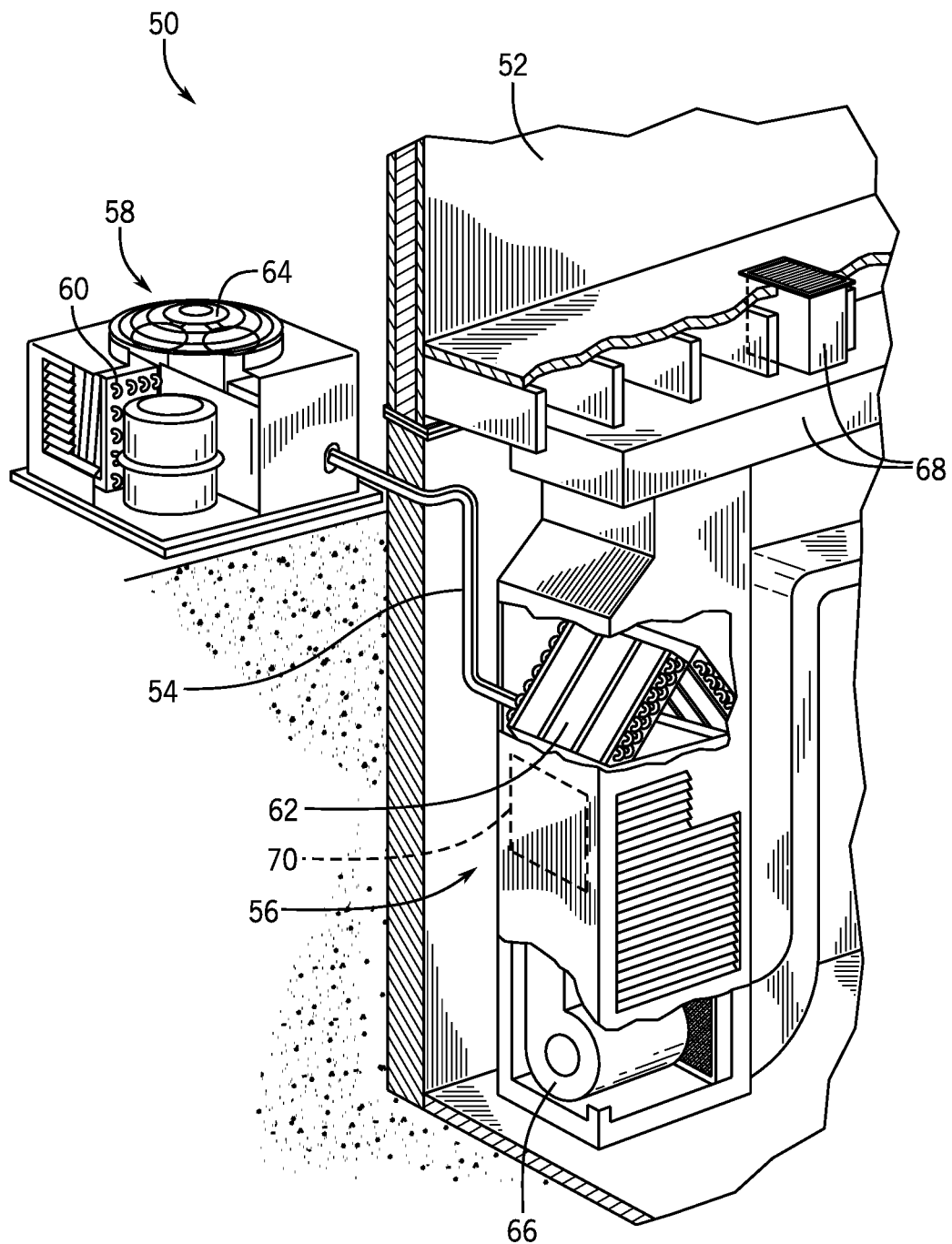
FIG. 3 is a cutaway perspective view of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower or fan 66 passes over the tubes or pipes and extracts heat from the combustion products. The heated air may then be routed from the furnace system 70 to the ductwork 68 for heating the residence 52.

Figure 4:
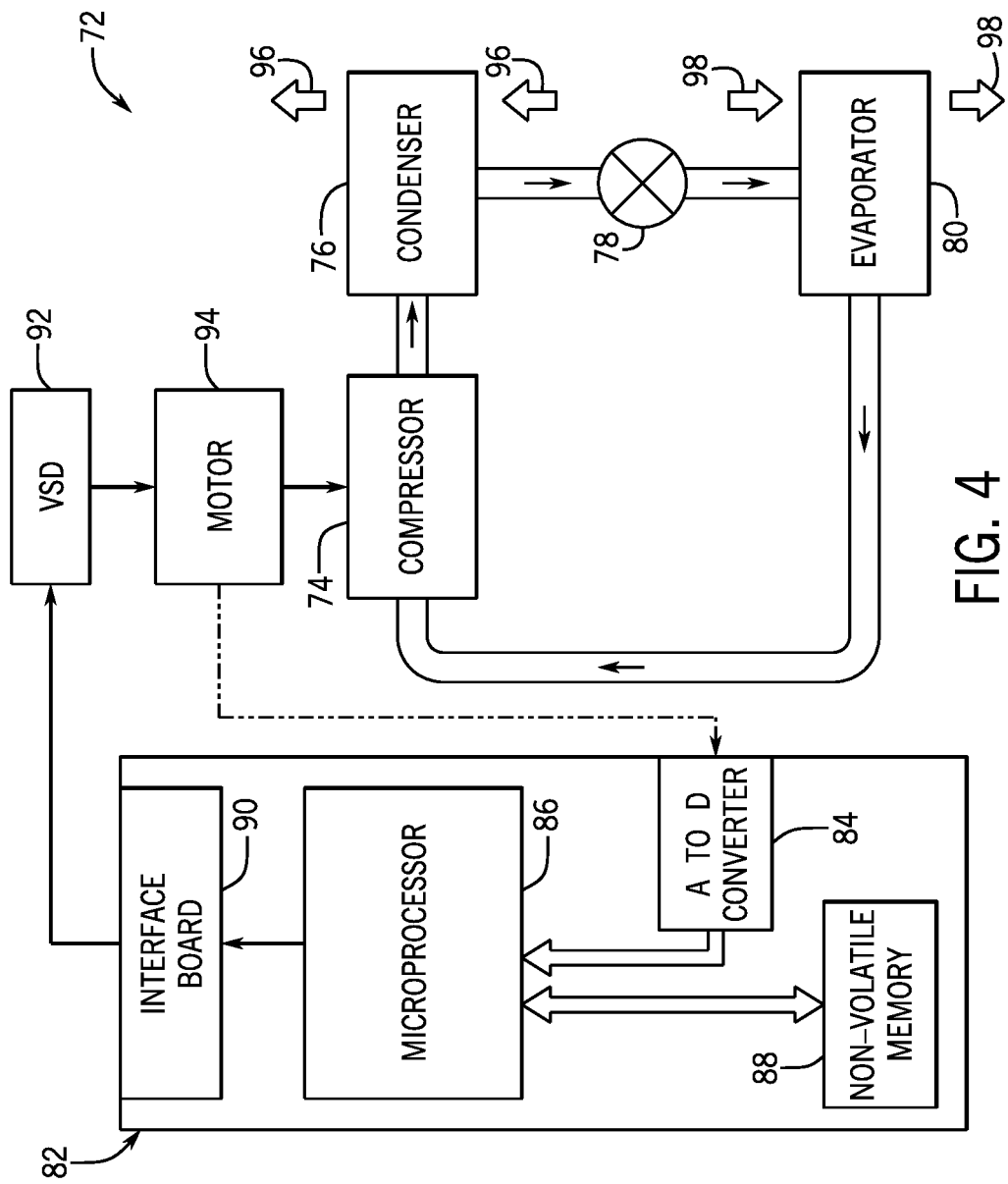
FIG. 4 is a schematic illustration of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, any of the systems illustrated in FIGS. 1-4 may include or operate in conjunction with a furnace in accordance with the present disclosure, such as the furnace system 70 of FIG. 3. For example, the furnace system 70 of FIG. 3 may generate combustion products, sometimes referred to as flue gas or exhaust gas, and then rout the combustion products through tubes (or coils) of the furnace system 70. In some embodiments, the furnace system 70 may include a first set of tubes referred to as primary tubes and a second set of tubes referred to as secondary tubes. An air flow may be biased over at least some of the tubes of the furnace system 70, for example by a fan or blower, such that the air flow is heated by the combustion products in the tubes of the furnace system 70 prior to delivery of the heated air flow to a conditioned space. As the combustion products lose heat to the air flow, liquid condensate may be formed inside of the tubes of the furnace system 70.

In accordance with the present disclosure, a condensate pan and a pocket coupled to the condensate pan may be utilized to collect and drain the above-described liquid condensate. The pocket may extend between the condensate pan and the tubes of the furnace system 70 and enhance a liquid condensate collection area and volume. By increasing the collection area and volume, additional heat exchange tubes may be added to the furnace system 70 without substantially increasing a footprint of the furnace system 70, thereby enhancing an efficiency of the furnace system 70 (e.g., from 90% efficiency or 95% efficiency to 99% efficiency). Further, by including the pocket extending between the condensate pan and the tubes of the furnace system 70, liquid condensate collection and drainage may be improved, thereby reducing a likelihood of water damage, air pressure damage, and associated operating interruptions and inefficiencies. In some embodiments, the above-described pocket may be retrofit to an existing furnace system 70 and drain pan. That is, the pocket may be coupled to an iteration of the drain pan that had previously been used and/or designed to operate without the pocket.

Figure 5:
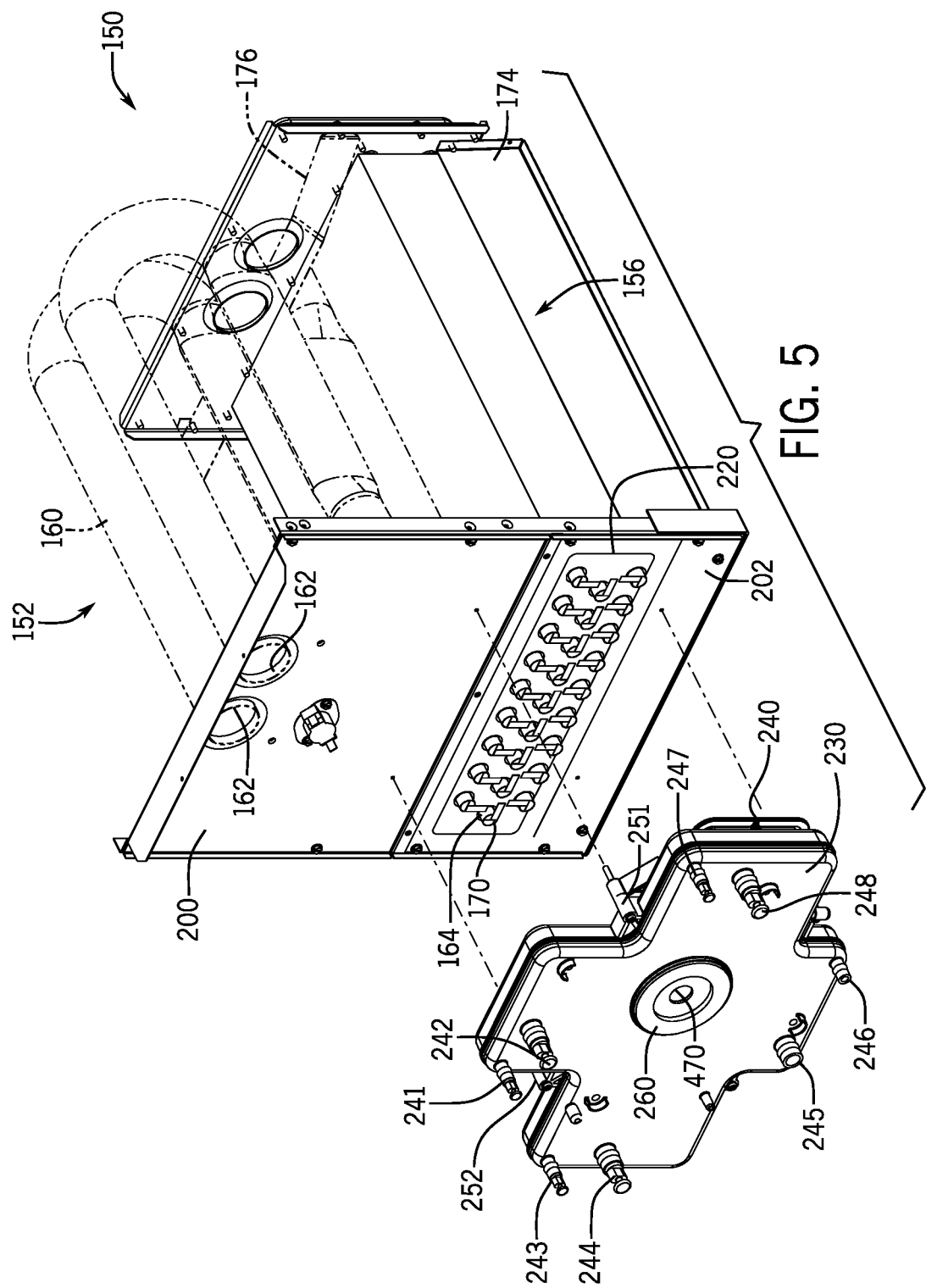
FIG. 5 is an exploded perspective view of a portion of a furnace, including a condensate pan and a pocket, that can be used with or in any of the systems of FIGS. 1-4, in accordance with an aspect of the present disclosure.

With this in mind, FIG. 5 is an exploded perspective view of an embodiment of a portion of a furnace 150 that can be used with or in any of the systems of FIGS. 1-4. For example, the furnace 150 in FIG. 5 may correspond to the furnace system 70 in FIG. 3. In the embodiment illustrated in FIG. 5, the furnace 150 includes a primary heat exchanger section 152 coupled to a first vestibule panel 200 of the furnace 150 (e.g., a set of primary tubes 160 of the primary heat exchanger section 152 may be coupled to the first vestibule panel 200 proximate inlets 162 to the primary tubes 160). The furnace 150 may also include a secondary heat exchanger section 156 coupled to a second vestibule panel 202 of the furnace 150 (e.g., a set of secondary tubes 164 of the secondary heat exchanger section 156 may be coupled to the second vestibule panel 202 proximate outlets 170 of the secondary tubes 164). In the illustrated embodiment, ends of the secondary tubes 164 are denoted. However, it should be understood that the secondary tubes 164 may extend into the secondary heat exchanger section 156 and fluidly couple with the primary tubes 160 adjacent to baffle 176. In some embodiments, a manifold, header, or other fluid distributor may be coupled between the primary tubes 160 and the secondary tubes 164 to enable a fluid coupling between the primary tubes 160 and the secondary tubes 164.

The first vestibule panel 200 and the second vestibule panel 202 may be coupled to one or more components of the HVAC system, such as to an enclosure or a cabinet (not shown) of the HVAC system or the furnace 150, to facilitate securement of the furnace 150 within the HVAC system and/or securement of various components of the furnace 150. The first vestibule panel 200 and the second vestibule panel 202 may also be configured to couple to one another to block relative movement of different parts of the furnace 150, such as relative movement of the primary heat exchanger section 152 and the secondary heat exchanger section 156. In some embodiments, the first vestibule panel 200 and the second vestibule panel 202 may be integrally formed as a single panel, such as from sheet metal.

As discussed herein, the furnace 150 may also include one or more combustors (not shown) configured to ignite a mixture of fuel and oxidant to generate combustion products. For example, the one or more combustors (not shown) may be fluidly coupled with the illustrated inlets 162 such that the combustion products are passed through the inlets 162 and to the primary tubes 160. The combustion products may travel through the primary tubes 160 and into the secondary tubes 164 of the secondary heat exchanger section 156. For example, the primary tubes 160 and the secondary tubes 164 may be coupled adjacent to the illustrated baffle 176, in some embodiments via a manifold, header, or other fluid distributor. As the furnace 150 is operated, an air flow may be directed (e.g., by a fan or a blower) over outsides of the primary tubes 160 and the secondary tubes 164 such that the air flow is heated by the combustion products within the primary tubes 160 and the secondary tubes 164, and such that the combustion products are cooled by the air flow.

As previously described, operation of the furnace 150 described above may cause condensate to form within the primary tubes 160 and/or the secondary tubes 164. For at least this reason, various aspects of the furnace 150 may be arranged to block a negative impact of the liquid condensate on the furnace 150. By way of example, components of the secondary heat exchanger section 156, such as the set of secondary tubes 164, the baffle 174, and/or the second vestibule panel 202, may be made of stainless steel, chromium, and/or another suitable (e.g., corrosion resistant) material to block effects of the condensate on the structural integrity and/or performance of the components.

In certain embodiments, the condensate may be less likely to contact components of, or otherwise impact, the primary heat exchanger section 152 than the secondary heat exchanger section 156 during operation of the furnace 150 (e.g., due to formation of the condensate within the secondary heat exchanger section 156 downstream of the primary heat exchanger section 152). For at least this reason, the components of the primary heat exchanger section 152, such as the set of primary tubes 160, the baffle 176 or a portion thereof, and/or the first vestibule panel 200, may be made of a suitable material (e.g., carbon steel, rolled steel, galvanized steel) having less corrosion resistance than the material utilized to form components of the secondary heat exchanger section 156. Indeed, the components of the primary heat exchanger section 152 may be made of a different material, such as a less expensive material, than that of the components of the secondary heat exchanger section 156.

Further, in accordance with embodiments of the present disclosure and as illustrated in FIG. 5, a condensate drain pan 230 may be positioned adjacent to the outlets 170 of the secondary tubes 164 and configured to receive condensate formed in, and traveling through, the primary tubes 160 and the secondary tubes 164 (e.g., via the outlets 170 of the secondary tubes 164). In accordance with present embodiments, a pocket 240 may be included between the drain pan 230 and the outlets 170 of the secondary tubes 164. The term pocket as used herein (e.g., the pocket 240) may refer to a geometric feature that is coupled to, or integral with, the condensate pan 230 and is configured to enhance a condensate collection area associated with the condensate pan 230. For example, as will be appreciated in view of the description below, the pocket 240 may be a frame member (e.g., rectangular frame member) coupled to the condensate pan 230 about a central opening (or mouth) in the condensate pan, where an additional opening of the pocket 240 includes a larger cross-sectional area than the central opening (or mouth) in the condensate pan 230. The larger cross-sectional area of the additional opening in the pocket 240 (e.g., relative to the smaller cross-sectional area of the central opening of the condensate pan 230) may enhance the collection area (or volume) associated with the condensate pan.

In order to collect condensate from all the outlets 170 of all the secondary tubes 164, the central opening or mouth (not shown) of the drain pan 230 must be sized to accommodate the distribution of secondary tubes 164. For example, in the illustrated embodiment, the outlets 170 of the secondary tubes 164 are positioned within a framed area 220 of the second vestibule panel 202. If the central opening or mouth (not shown) of the drain pan 230 is substantially smaller than the illustrated framed area 220 such that certain of the secondary tubes 164 are not aligned with the central opening or mouth (not shown) of the drain pan 230, the central opening or mouth (not shown) of the drain pan 230 may be too small to collect condensate from all the secondary tubes 164. Further, even if the central opening or mouth (not shown) of the drain pan 230 is large enough to accommodate all the secondary tubes 164 in the illustrated embodiment, the central opening or mouth (not shown) of the drain pan 230 may act as a constraint if the furnace 150 is modified to include additional secondary tubes 164. Indeed, the furnace 150 may be, for example, modular such that secondary heat exchange section 156 could be replaced with a replacement section having a larger number of tubes. The pocket 240 used in conjunction with the drain pan 230 may overcome this constraint.

In some embodiments, the pocket 240 may be retrofitted to an existing drain pan 230 to enhance the collection area and/or volume of the existing drain pan 230. In addition to increasing a number of tubes that can be used in the furnace 150, enhancing the condensate collection area and/or volume may also improve protection of the furnace 150 against water and/or pressure damage, such as water and/or pressure damage to electronic componentry and/or physical structures of the furnace 150. Further, in some embodiments, the pocket 240 may be added to the furnace 150 along with additional secondary tubes 164 made possible by the improved condensate management features described above. These and other features will be described in detail below.

The drain pan 230 may be coupled to the second vestibule panel 202 by at least one or more fasteners (not shown) that may extend through holes in posts 251 and 252. In other embodiments, the drain pan 230 may be secured via welding, adhesives, or any other combination thereof. In some embodiments, the drain pan 230 may be coupled to the second vestibule panel 202 via the pocket 240 discussed above and described in detail below. That is, in some embodiments, the pocket 240 may couple to the second vestibule panel 202 and to the drain pan 230, thereby coupling the drain pan 230 to the second vestibule panel 202.

As previously described, the drain pan 230 may receive condensate formed during the operation of the furnace 150. For instance, the drain pan 230 may be fluidly coupled to the set of secondary tubes 164 and may receive the condensate formed during operation of the furnace 150, such as from the cooling of the combustion products as previously described. Further, the drain pan 230 may block combustion products from undesirably flowing out of the primary heat exchanger section 152 and/or from the secondary heat exchanger section 156 (e.g., via the drain lines). As an example, the drain pan 230 may include an outlet 470 and a gasket 260 surrounding the outlet 470. During operation of the furnace 150, the outlet 470 may be blocked (e.g., via a valve or other blocker) such that condensate accumulates within a volume of the drain pan 230, and such that the combustion products are blocked from flowing through the outlet 470. The condensate may further be collected into internal fluid chambers (not shown) within the drain pan 230. During certain intervals, the outlet 470 may be opened such that combustion products can be vented from the furnace 150. Additionally, the drain pan 230 may have one or more discharge ports 241, 242, 243, 244, 245, 246, 247, 248 from which the liquid condensate may be removed after being collected in the drain pan 230 (e.g., during a maintenance procedure). Detailed aspects of the drain pan 230 and the pocket 240 are illustrated in FIGS. 6-14 and described in detail below.

Figure 6:
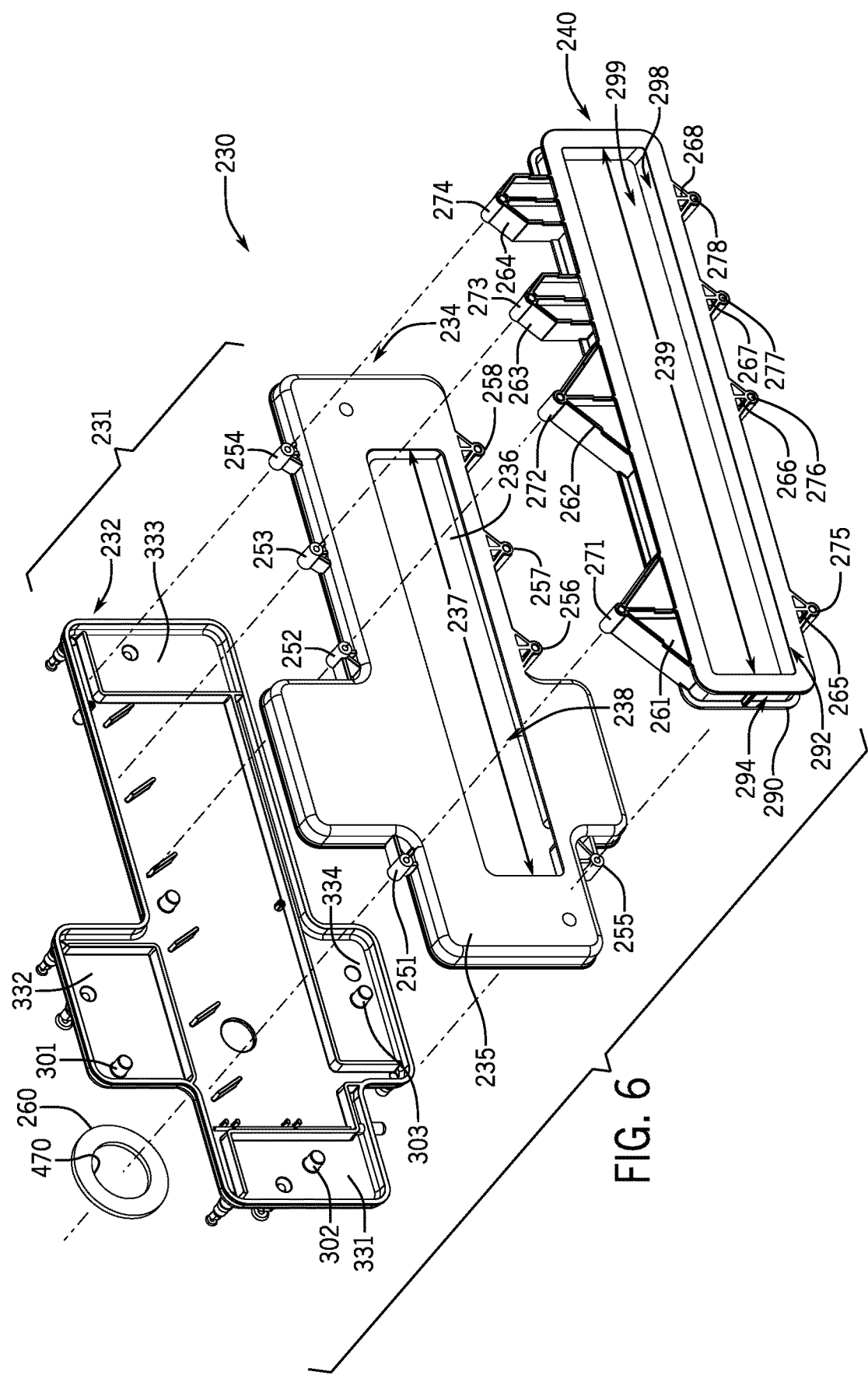
FIG. 6 is an exploded perspective view of a condensate pan and pocket configured to collect and drain liquid condensate formed in or on a heat exchanger, such as the furnace of FIG. 5, in accordance with an aspect of the present disclosure.

FIG. 6 is an exploded perspective view of an embodiment of the condensate drain pan 230 and the pocket 240 configured to collect and drain liquid condensate formed in or on a heat exchanger, such as the furnace 150 of FIG. 5. The drain pan 230 may include a main body 231 formed by a first shell component 232 and a second shell component 234 having similar outer perimeters. The first shell component 232 and the second shell component 234 may be configured to be coupled together to form internal fluid chambers utilized to collect liquid condensate. In another embodiment, the drain pan 230 may include one or more integral components, namely, the illustrated first and second shell components 232, 234 may be integrally formed as a single shell.

In the illustrated embodiment, the first shell component 232 and the second shell component 234 may be coupled together by one or more posts (not shown) that extend from an interior and inward facing surface of the second shell component 234 to couple with receptacles 301, 302, 303 formed in an interior and inward facing surface of the first shell component 232. In other embodiments, the posts and receptacles may be located in different areas to secure the coupling between the first shell component 232 and the second shell component 234. It should be noted that any number of posts and receptacles may be used to secure the coupling and are not limited by the receptacles illustrated in FIG. 6. Further, the coupling between the first shell component 232 and the second shell component 234 is not limited to the use of posts and receptacles. In some embodiments, the coupling between the first and second shell components 232, 234 may be achieved via welding, adhesive, fasteners or any other combination thereof. The second shell component 234 may also be fitted with a plurality of posts 251, 252, 253, 254, 255, 256, 257, and 258 which may have an opening and are configured to enable a coupling of the second shell component 234 to the an aspect of a furnace (e.g., the second vestibule panel 202 in FIG. 5). For example, fasteners (not shown) may pass through the openings of the plurality of posts 251, 252, 253, 254, 255, 256, 257, and 258, and may serve to attach the drain pan 230 to a the second vestibule panel 202 or some other furnace features illustrated in FIG. 5. In other embodiments, the drain pan 230 may be secured via other mechanisms including welding, adhesives, or any other combination thereof.

The second shell component 234 may have an exterior surface 235 and an opening 236 (e.g., surrounded by the exterior surface 235). When coupled together, the first shell component 232 and the second shell component 234 may form a recess 238 adjacent to, and defined in part by, the opening 236, where condensate may be collected by moving through the opening 236 and into the recess 238. The opening 236 may have a first cross-sectional area, and as previously described, the opening 236 and corresponding recess 238 may be configured to receive liquid condensate from various heat exchange tubes. In general, the configuration and/or amount of the heat exchange tubes (e.g., the secondary tubes 164 in FIG. 5) may be limited by the cross-sectional area of the opening 236 of the condensate drain pan 230 and/or the volume of the recess 238. For example, if certain of the heat exchange tubes are not aligned with the opening 236, the opening 236 may not receive condensate formed in the heat exchange tubes. Including the pocket 240, which may have an opening with a second cross-sectional area larger (described in detail below) than the first cross-sectional area of opening 236 of the drain pan 230, may facilitate improved condensate collection and may enable a larger number of heat exchange tubes. Further, in fluid communication with the recess 238, the drain pan 230 may include a number of chambers 331, 332, 333, and 334 fluidly coupled with the recess 238 and configured to collect condensate traveling through the recess 238. The fluid chambers 331, 332, 333, and 334 will be discussed in greater detail with respect to a similar embodiment of the drain pan 230 illustrated in FIG. 9.

In accordance with present embodiments and as illustrated in FIG. 6, the pocket 240 may be configured to couple to the second shell component 234 to increase the collection surface area and collection volume of the drain pan 230, as noted above. The pocket 240 may have a first surface 290 that is configured to interact with (e.g., contact) the exterior surface 235 of the second shell component 234 and a second surface 292 that is configured to interact with (e.g., contact) the second vestibule panel 202 shown in FIG. 5. Extending between the first surface 290 and the second surface 292 is a wall 294 of the pocket 240 which may serve to surround the opening 236 of the drain pan 230 and help collect condensate as it passes toward the drain pan 230. That is, the wall 294 of the pocket 240 may include an interior surface 298 defining an opening 299 of the pocket 240. The opening 299 in the pocket 240 may include a second, larger cross-sectional area than the first cross-sectional area of opening 236 in the drain pan 230. Indeed, as shown in FIG. 6 and described in more detail below, a length 239 of the opening 299 in the pocket 240 is greater than a length 237 of the opening 236 in the drain pan 230. Thus, the pocket 240 expands the condensate collection area for receiving condensate from heat exchange tubes.

The pocket 240 may have a number of tabs 261, 262, 263, 264, 265, 266, 267, and 268 which may have a corresponding number of posts 271, 272, 273, 274, 275, 276, 277, and 278 which may have an opening. As described above, the second shell component may also have posts 251, 252, 253, 254, 255, 256, 257, and 258 which may have an opening. The openings of the posts 251, 252, 253, 254, 255, 256, 257, and 258 may align with the openings of the posts 271, 272, 273, 274, 275, 276, 277, and 278 and may be configured to enable a coupling of the second shell component 234 and the pocket 240. For example, fasteners (not shown) may pass through the openings of the posts 251, 252, 253, 254, 255, 256, 257, and 258, and through the openings of posts 271, 272, 273, 274, 275, 276, 277, and 278, and may serve to couple the pocket 240 to the second shell component 234. The fasteners (not shown) may also serve to attach the second shell component 234 to the second vestibule panel 202 or some other furnace features illustrated in FIG. 5, as described above.

The tabs 261, 262, 263, 264, 265, 266, 267, and 268 may include different shapes to facilitate the alignment of the pocket 240 with the second shell component 234. The tabs 261, 262, 263, 264, 265, 266, 267, and 268 may also be used to enhance the structural integrity of the drain pan 230. The shapes of the tabs 261, 262, 263, 264, 265, 266, 267, and 268 are not limited by the triangular or pentagonal shapes illustrated in FIG. 6. For example, in some embodiments, the tabs 261, 262, 263, 264, 265, 266, 267, and 268 may include rectangular or other shapes.

The pocket 240 may be configured such that the opening 299 of the pocket 240 surrounds the opening 236 and extends outwardly beyond the opening 236 of the second shell component 234. That is, the length 239 of the pocket 240 may be greater than the length 237 of the opening 236. Thus, the interior surface 298 of the wall 294 is offset from the opening 236 of the drain pan 230 by a portion of the surface 235 of the second shell component 234. That is, a portion of the surface 235 surrounding the opening 236 in the drain pan 230 is positioned inwards from the interior surface 298 of the wall 294 defining the opening 299 in the pocket 240. By including the above-described pocket 240 having the above-described opening 299, condensate that has fallen outside of the opening 236 and onto the exterior surface 235 of the second shell component 234 is contained by the pocket 240 and fed into the recess 238. In other words, the opening 299 of the pocket 240 may define a volume above the recess 238 defined in the drain pan 230. By adding the pocket 240, a condensate collection area is enhanced and more heat exchange tubes (e.g., the secondary tubes 164 illustrated in FIG. 5) may be added. In some embodiments, the above-described pocket 240 may be retrofit to an existing furnace and drain pan. That is, the pocket 240 may be coupled to an iteration of the drain pan 230 that had previously been used and/or designed to operate without the pocket 240.

Figure 7:
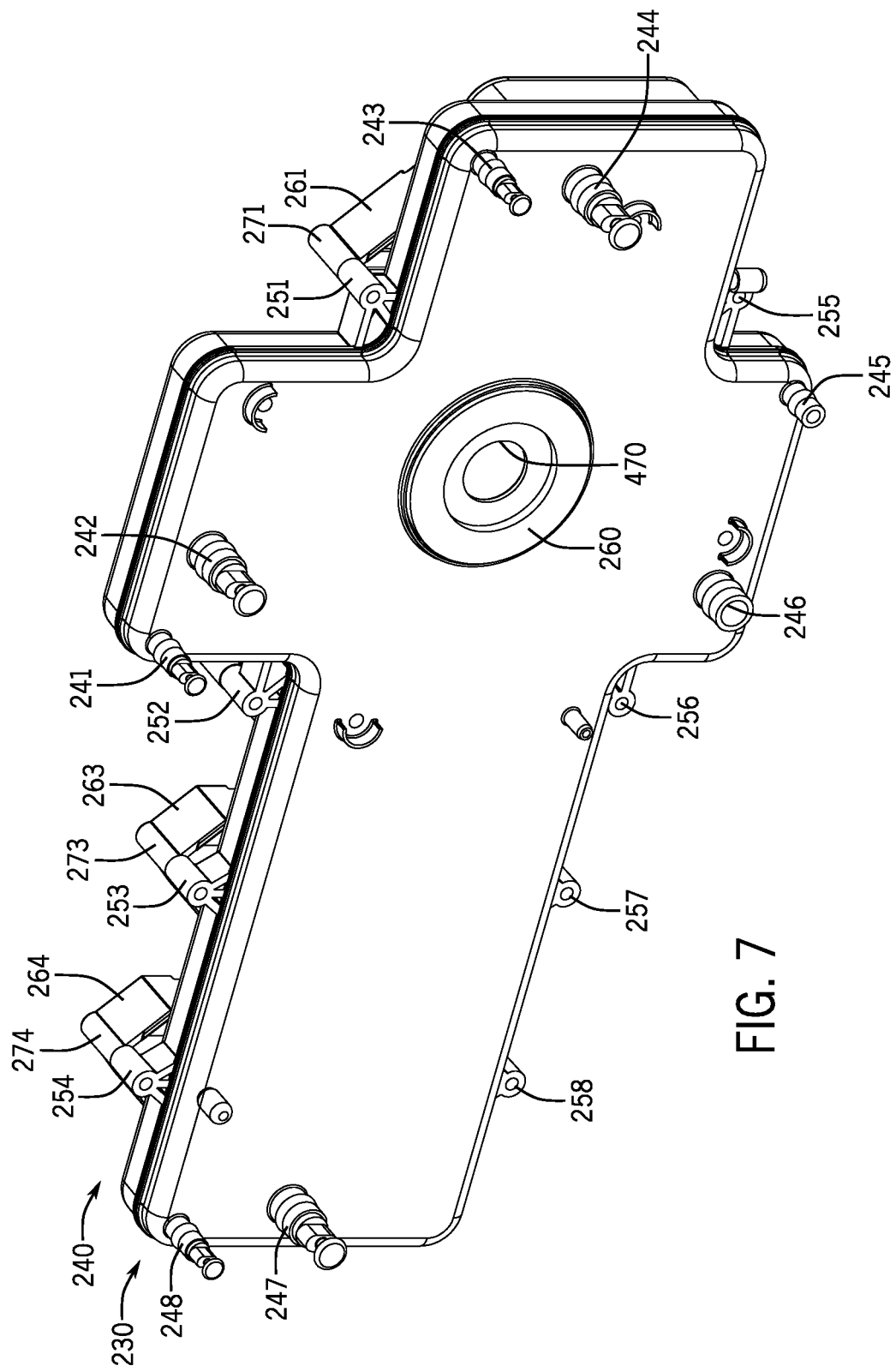
FIG. 7 is a rear perspective view of the condensate pan and pocket of FIG. 5, in accordance with an aspect of the present disclosure.

FIG. 7 is a rear perspective view of the drain pan 230 and the pocket 240 of FIG. 6. As discussed above, the drain pan 230 and the pocket 240 may be aligned using the plurality of tabs 261, 262, 263, 264, 265, 266, 267, and 268 (some of which are hidden in FIG. 7 but observable in FIG. 6) and coupled together using fasteners (not shown) that pass through the holes of posts 251, 252, 253, 254, 255, 256, 257, and 258 and through the holes of posts 271, 272, 273, 274, 275, 276, 277, and 278. The use of the tabs 261, 262, 263, 264, 265, 266, 267, and 268, the posts 251, 252, 253, 254, 255, 256, 257, and 258, and the posts 271, 272, 273, 274, 275, 276, 277, and 278 are described above with respect to FIG. 6. The discharge ports 241, 242, 243, 244, 245, 246, 247, 248 may also be in fluid communication with the recess 238 (illustrated in FIG. 6) such that any condensate collected in the recess 238 of the drain pan 230 may be removed via discharge lines (not shown) that are coupled to the discharge ports 241, 242, 243, 244, 245, 246, 247, 248. As will be appreciated in view of further discussion, the discharge ports 241, 242, 243, 244, 245, 246, 247, 248 may be fluidly coupled with various fluid chambers in the drain pan 230, the chambers being fluidly coupled with the above-described recess 238. The discharge ports 241, 242, 243, 244, 245, 246, 247, and 248 may be closed to prevent the fluid condensate from draining from the fluid chambers. At certain intervals, the discharge ports 241, 242, 243, 244, 245, 246, 247, and 248 may be opened to allow the liquid condensate to drain from the fluid chambers. Condensate drainage may occur during a maintenance period in which the system (e.g., the furnace 150 of FIG. 5) is not in operation.

It should be noted that the drain pan 230 may be configured with any number of discharge ports that may facilitate the removal of condensate, and the location of the discharge ports is not limited by those illustrated in the figure. As discussed above, the drain pan 230 may also include an outlet 470 and a gasket 260 surrounding the outlet 470. During operation of the furnace 150 (illustrated in FIG. 5), combustion products (e.g., flue gas) may be formed and pass through the primary and secondary heat exchanger sections 152, 156 (illustrated in FIG. 5) and into drain pan 230. At certain intervals, the outlet 470 may be opened such that combustion products can be vented from the furnace 150.

Figure 8:
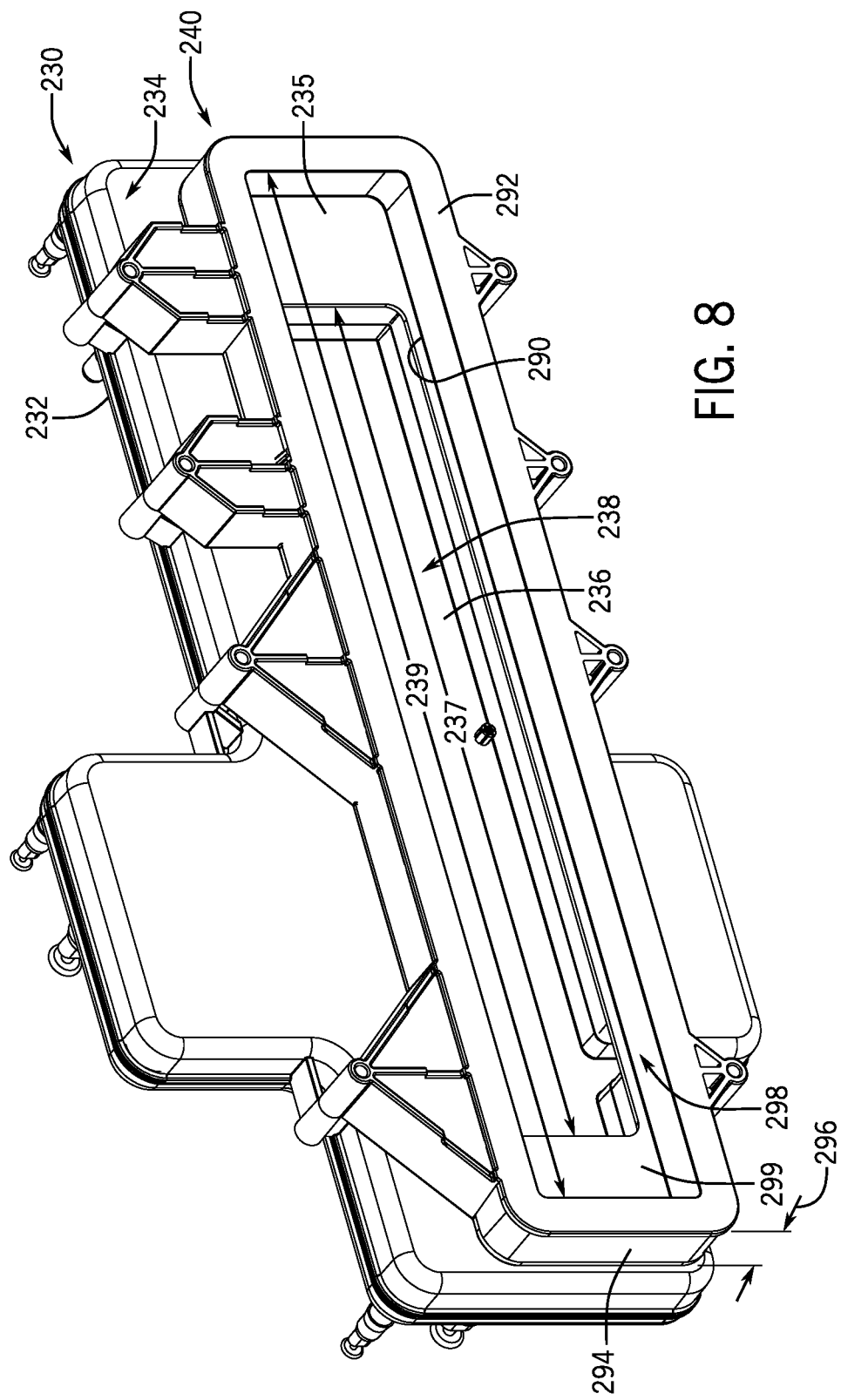
FIG. 8 is a perspective view of the condensate pan and pocket of FIG. 5, in accordance with an aspect of the present disclosure.

FIG. 8 is a front perspective view of the drain pan 230 and the pocket 240 of FIG. 6. As shown in the illustrated embodiment, the pocket 240 may extend from, or couple to, the exterior surface 235 of the second shell component 234.

The pocket 240 includes the first surface 290 that may interact with (e.g., contact) the exterior surface 235 of the second shell component 234. The first surface 290 of the pocket 240 may be configured to sit flush with the exterior surface 235 of the second shell component 234 such that any condensate collected from the system is blocked from moving through an interface between the first surface 290 of the pocket 240 and the exterior surface 235 of the second shell component 234, and instead may be trapped inside the opening 299 of the pocket 240, the recess 238 of the drain pan 230, and/or various chambers of the drain pan 230 fluidly coupled with the recess 238. In some embodiments, the interaction (e.g., physical contact or coupling) between the first surface 290 of pocket 240 and the exterior surface 235 of second shell component 234 may be facilitated by a sealing membrane (not shown) or any other method known in the art. That is, the first surface 290 of the pocket 240 may be sealed against the exterior surface 235 of the second shell component 234. As previously described, the pocket 240 may have the second surface 292 opposite the first surface 290, where the second surface 292 may be configured to interact with the second vestibule panel 202 (illustrated in FIG. 5). The wall 294 extends between the first surface 290 of the pocket 240 and the second surface 292 of the pocket 240. A height 296 of the wall 294 (i.e. the distance between the first surface 290 and second surface 292 of the pocket 240) may be varied to accommodate different tube configurations and is not limited by the illustrated figure.

The wall 294, as previously described, includes the interior surface 298 that surrounds and defines the opening 299 in the pocket 240. As previously described with respect to FIG. 5, heat exchange tubes may extend toward the pocket 240 and, in some instances, into the opening 299 defined by the pocket 240. The second surface 292 of the pocket 240 may be configured to sit flush with (e.g., contact) the second vestibule panel 202 (illustrated in FIG. 5) such that the heat exchange tubes (e.g., secondary tubes 164 of FIG. 5) may extend over the interior surface 298 of the wall 294 of pocket 240. As condensate moves through the system, the fluid may fall off of the secondary tubes (not shown) and onto the interior surface 298 of the wall 294 which then may be directed towards opening 236 and into the recess 238.

The pocket 240 may also extend across the exterior surface 235 of second shell component 234 such that the pocket 240 extends longitudinally beyond the opening 236 of second shell component 234. That is, the length 239 of the pocket 240 may be greater than the length 237 of the opening 236. For instance, as shown in FIG. 8, the wall 294 of pocket 240 completely encompasses opening 236 and additionally encompasses a portion of the exterior surface 235 of second shell component 234. Without the presently disclosed pocket 240, tube sizes and configurations would be limited to the size of the opening 236 in the drain pan 230. By adding the pocket 240 as described above, condensate that falls outside of opening 236 and onto exterior surface 235 may be collected by the pocket 240 and fed into the drain pan 230 (e.g., the recess 238 of the drain pan 230) where it may then be removed from the system.

Figure 9:
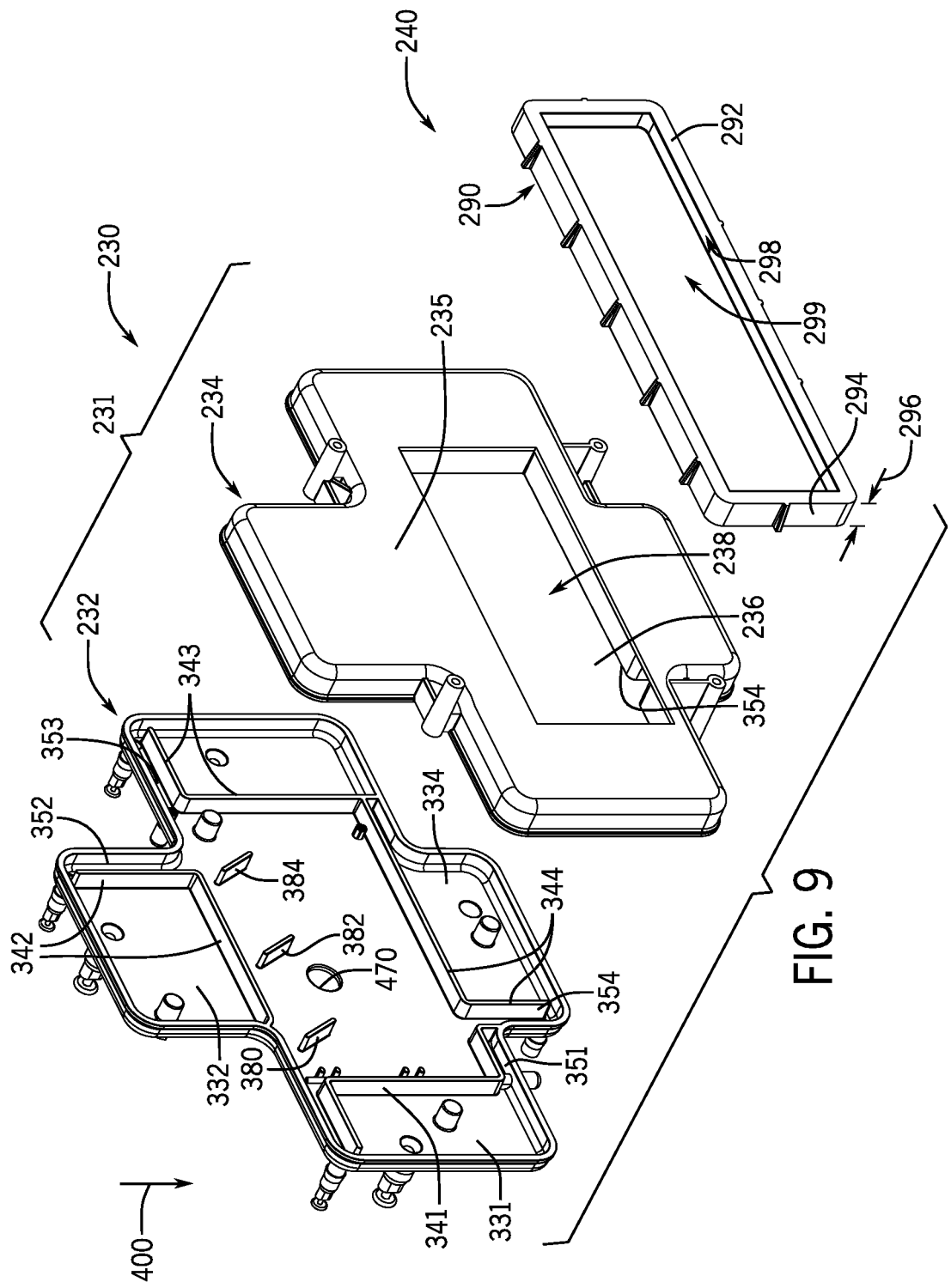
FIG. 9 is an exploded perspective view of a condensate pan and pocket configured to collect and drain liquid condensate formed in or on a heat exchanger, such as the furnace of FIG. 5, in accordance with an aspect of the present disclosure.

FIG. 9 is an exploded perspective view of an embodiment of the drain pan 230 and the pocket 240 configured to collect and drain liquid condensate formed in or on a heat exchanger, such as the furnace 150 of FIG. 5. As discussed above, the drain pan 230 may include the main body 231 formed by the first shell component 232 and the second shell component 234 having similar outer perimeters. In some embodiments, the first shell component 232 may be configured to couple to second shell component 234 to form the recess 238. As discussed above with respect to FIG. 6, the drain pan 230 may have one or more fluid chambers 331, 332, 333, and 334 which may be in fluid communication with recess 238 to allow for the movement and collection of liquid condensate into the one or more fluid chambers 331, 332, 333, and 334. Each fluid chamber 331, 332, 333, and 334 may be lined with a respective set of internal dividers. That is, fluid chamber 331 may have a set of internal dividers 341, fluid chamber 332 may have a set of internal dividers 342, fluid chamber 333 may have a set of internal dividers 343, and fluid chamber 334 may have a set of internal dividers 344. The internal dividers 341, 342, 343, and 344 may extend between the interior surface of first shell component 232 and the interior surface of second shell component 234, and 344 may function to collect and trap liquid condensate into their respective fluid chambers 331, 332, 333, and 334 such that the condensate may be removed via one or more of the discharge ports 241, 242, 243, 244, 245, 246, 247, 248 (illustrated in FIG. 7). The internal dividers 341, 342, 343, and 344 may also serve to prevent fluid from reaching the gasket 260 and outlet 470 thereby preventing condensate backflow or overflow, which can cause severe damage to the system.

Each set of internal dividers 341, 342, 343, and 344 may define a respective channel that allows for fluid communication between the recess 238 and the respective fluid chambers 331, 332, 333, and 334. That is, internal dividers 341 may define a channel 351 in fluid communication with fluid chamber 331, internal dividers 342 may define a channel 352 in fluid communication with fluid chamber 332, internal dividers 343 may define a channel 353 in fluid communication with fluid chamber 333, and internal dividers 344 may define a channel 354 in fluid communication with fluid chamber 334. The channels 351, 352, 353, and 354 may also be in fluid communication with the recess 238 thereby guiding liquid condensate from the recess 238 into one of the respective fluid chambers 331, 332, 333, and 334. For example, in the embodiment shown, liquid condensate may move through the heat exchange tubes (e.g., secondary tubes 164 illustrated in FIG. 5) and into the pocket 240. A gravitational force 400 may cause the condensate to fall off of the heat exchange tubes (not shown) and onto the interior surface 298 of the wall 294 of the pocket 240. As condensate is collected within the pocket 240, the condensate may then move through the opening 236 and into the recess 238. Once the condensate has reached the recess 238, the gravitational force 400 may cause the condensate to move towards fluid chamber 334. Such condensate would travel through channel 354, defined by internal dividers 344, and into the fluid chamber 334 where it is trapped by the internal dividers 344 associated with fluid chamber 334. Upon collection into the fluid chamber 334, the condensate may then be removed by one of the discharge ports in fluid communication with fluid chamber 334. The channels and fluid chambers may also be configured to prevent condensate from reaching the outlet 470, thereby preventing backflow or overflow which may potentially damage the system. It should be noted that each fluid chamber 331, 332, 333, and 334 may be configured with its own respective set of discharge ports (e.g., discharge ports 241, 242, 243, 244, 245, 246, 247, 248 illustrated in FIG. 7), internal dividers 341, 342, 343, and 344, and channels 351, 352, 353, and 354. Depending on the orientation of the heat exchange system, any one of the at least one fluid chambers 331, 332, 333, and 334 may be configured to collect the condensate. In some embodiments, each chamber may be fixed with a plurality of dividers and channels to facilitate the removal of condensate and are not limited to the configurations illustrated in the figures.

Additionally, in some embodiments, each fluid chamber may be configured with a sensor (not shown) which may serve to detect when a particular fluid chamber is filling or filled with condensate. In response to a determination that the fluid chamber has reached a certain threshold volume, the sensor may send a message to the system to shut down so that further damage from overflow or backflow may be avoided and the required maintenance may be performed. In other embodiments, the sensor may send a notification to a user so the user can determine what should be done to remedy the problem.

As illustrated in FIG. 9, walls 380, 382, and 384 may also be added and may be configured to extend between the interior surface of the first shell component 232 and the interior surface of the second shell component 234. These walls 380, 382, and 384 may provide additional structural integrity to the drain pan 230, and may serve as a barrier to prevent liquid condensate from reaching outlet 470. Further, the walls 380, 382, and 384 may also be used to help direct liquid condensate into one of the channels 351, 352, 353, and 354 which are in fluid communication with their respective fluid chambers 331, 332, 333, and 334, as described above. It should be noted that any number of walls may be used to facilitate the directed flow of liquid condensate into one of the fluid chambers, and the location of the flaps is not limited by those illustrated in FIG. 9.

Figure 10:
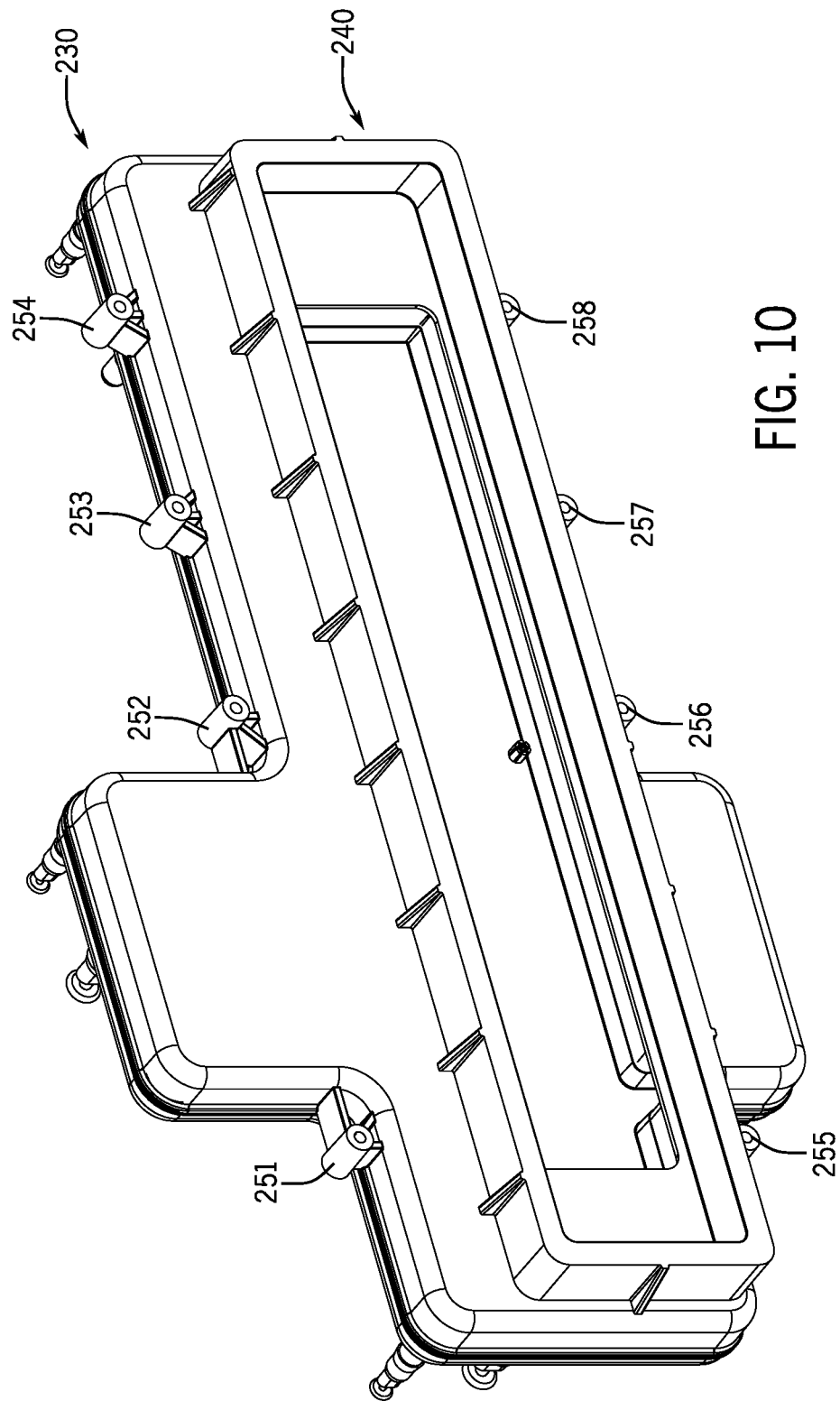
FIG. 10 is a perspective view of the condensate pan and pocket of FIG. 9, in accordance with an aspect of the present disclosure.

FIG. 10 is a front perspective view of an embodiment of the drain pan 230 and the pocket 240 of FIG. 9. In some embodiments, the first shell component 232 and the second shell component 234 may be integrated to form one drain pan 230. Further, the pocket 240 may be coupled to the drain pan 230 without the use of the tabs and posts illustrated in FIGS. 6-8, and may be coupled via welding, adhesives, or the like. In some embodiments, the pocket 240 may be integrally formed with the drain pan 230 as a single-piece construction (e.g., additively manufactured, injected molded, formed from sheet metal, or the like). As described above, the drain pan 230 may be fitted with the posts 251, 252, 253, 254, 255, 256, 257, and 258. Fasteners (not shown) may pass through openings of the posts 251, 252, 253, 254, 255, 256, 257, and 258, and may serve to attach the drain pan 230 to a furnace 150 like the one seen in FIG. 5. In other embodiments, the drain pan 230 is comprised of a first shell component 232 and a second shell component 234 coupled together as described in the figures above. It should be noted that many of the features and functions of the drain pan 230 described above with respect to FIGS. 5-9 perform similarly in the embodiment illustrated in FIG. 10 and thus are not further described with respect to FIG. 10.

Figure 11:
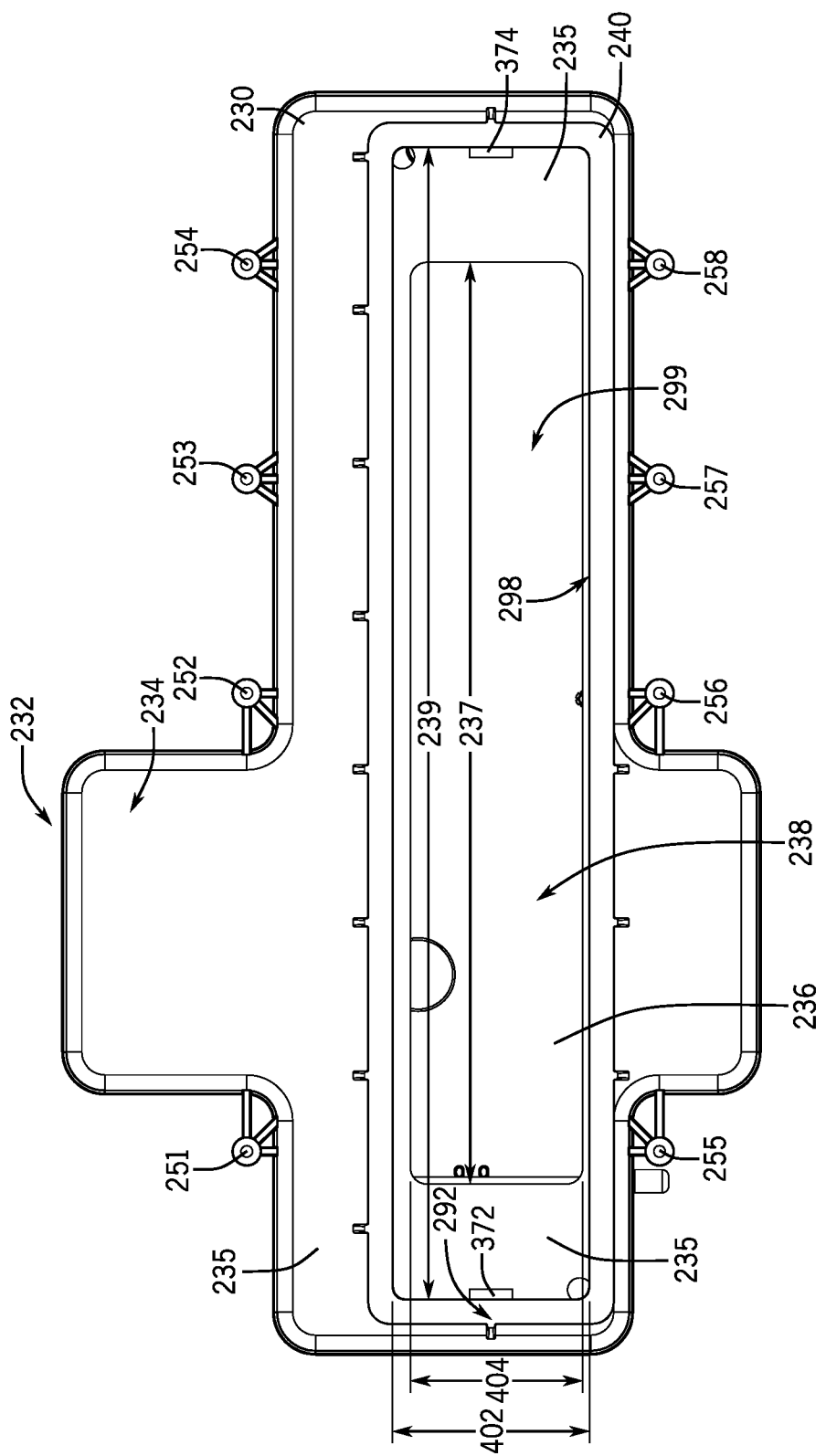
FIG. 11 is a top-down view of the condensate pan and pocket of FIG. 9, in accordance with an aspect of the present disclosure.

FIG. 11 is a top-down view of an embodiment of the condensate pan of FIG. 10. In the illustrated embodiment, the drain pan 230 may be adorned with the posts 251, 252, 253, 254, 255, 256, 257, and 258, which may serve to secure the drain pan 230 in place on a furnace (e.g., the furnace 150 shown in FIG. 5) via fasteners (not shown) passing through the holes of the posts 251, 252, 253, 254, 255, 256, 257, and 258. The fluid chambers 331, 332, 333, and 334 (illustrated in FIG. 9 and described above), may be in fluid communication with the recess 238 which allow for condensate to be trapped, collected, and removed from the system. The pocket 240 may have a first surface (e.g., surface 290 illustrated in FIG. 9) that is configured to interact with (e.g., contact) the exterior surface 235 of the second shell component 234 and a second surface 292 that is configured to interact with (e.g., contact) the second vestibule panel 202 shown in FIG. 5. Extending between the first surface 290 and the second surface 292 is a wall 294 (not shown) of the pocket 240 which may serve to surround the opening 236 of the drain pan 230 and help collect condensate as it passes toward the drain pan 230. That is, the wall 294 of the pocket 240 may include an interior surface 298 defining an opening 299 of the pocket 240. The opening 299 in the pocket 240 may include a larger cross-sectional area than the opening 236 in the drain pan 230. That is, the length 239 of the opening 299 of the pocket 240 may extend beyond the length 237 of the opening 236 of the drain pan 230. Further, a width 402 of the opening 299 of the pocket 240 may extend beyond a width 404 of the opening 236 of the drain pan 230. Thus, the pocket 240 expands the condensate collection area for receiving condensate from heat exchange tubes. In the illustrated embodiment, slots 372 and 374 can also be seen on the exterior surface 235 of the second shell component 234 of drain pan 230. The pocket 240 may extend beyond these slots 372 and 374 so as to encompass the slots 372 and 374 within the pocket 240. Once encompassed by the pocket 240, these slots 372 and 374 may serve to facilitate the drainage of condensate from the drain pan 230 by allowing condensate that collects outside of opening 236 and onto exterior surface 235 to pass through the slots 372 and 374 and into the recess 238.

By adding the pocket 240 and the slots 372 and 374, the size and configuration of the heat exchange tubes (not shown) is not limited by the opening 236 in the drain pan 230. Instead, more tubes may be added and the configuration may be changed to fit within the space captured by the opening 299 in the pocket 240. In doing so, the efficiency of the system may be improved (e.g., from 90% efficiency or 95% efficiency to 99% efficiency). For example, additional secondary tubes 164 (illustrated in FIG. 5) may be added that are located over exterior surface 235. Because exterior surface 235 has slots that allow for drainage of condensate into the recess 238, any condensate that may collect on exterior surface 235 may still be removed from the system. It should be noted that the size, location, and number of slots used to facilitate the drainage of condensate from the system is not limited by those illustrated in FIG. 11 and may include any number of configurations that allow for improved drainage of condensate.

Figure 12:
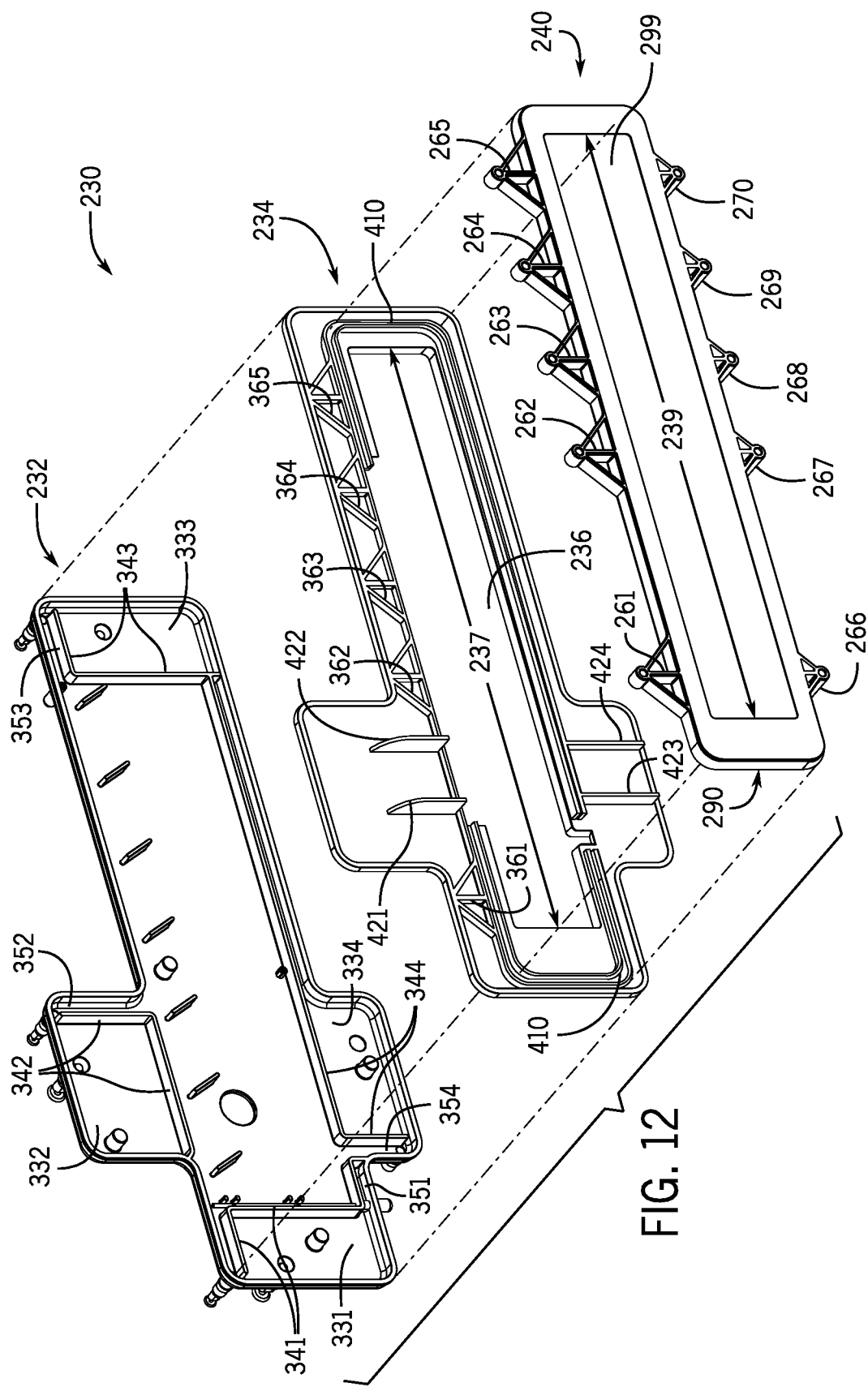
FIG. 12 is an exploded perspective view of a condensate pan and pocket configured to collect and drain liquid condensate formed in or on a heat exchanger, such as the furnace of FIG. 5, in accordance with an aspect of the present disclosure.

FIG. 12 is an exploded perspective view of an embodiment of the drain pan 230 and the pocket 240 configured to collect and drain liquid condensate formed in or on a heat exchanger, such as the furnace 150 of FIG. 5. As described above, the first shell component 232 and the second shell component 234 may be configured to be coupled together to form internal fluid chambers utilized to collect liquid condensate. The pocket 240 may be configured to couple to the second shell component 234 to increase the collection surface area and collection volume of the drain pan 230, as noted above. As described above with respect to FIG. 6, the pocket 240 may have a number of tabs 261, 262, 263, 264, 265, 266, 267, 268, 269, and 270 configured to facilitate the alignment and coupling of the pocket 240 with the drain pan 230. For example, the tabs 261, 262, 263, 264, and 265 may be configured to align and couple with receptacles 361, 363, 363, 364, and 365 which may be defined by extensions that extend from the surface 235 of the second shell component 234 and are configured to receive the tabs 261, 262, 263, 264, and 265. It should be noted that tabs 266, 267, 268, 269, and 270 may similarly be configured to align and couple to receptacles that may be defined by extensions extending from an opposite side of the second shell component 234 from the receptacles 361, 362, 363, 364, and 365. Further, the first surface 290 of the pocket 240 may be configured to align and couple with an alignment channel 410 which may also be defined by extensions that extend from the surface 235 of the second shell component 234 and may be configured to receive the first surface 290 of the pocket 240. The tabs 421, 422, 423, and 424 may extend from the surface 235 of the second shell component 234 and may also be configured to facilitate the alignment and coupling of the pocket 240 to the second shell component 234. As illustrated in FIG. 12, the length 239 of the opening 299 of the pocket 240 may be extended to accommodate an additional number of heat exchange tubes (e.g., secondary tubes 164 illustrated in FIG. 5).

Figure 13:
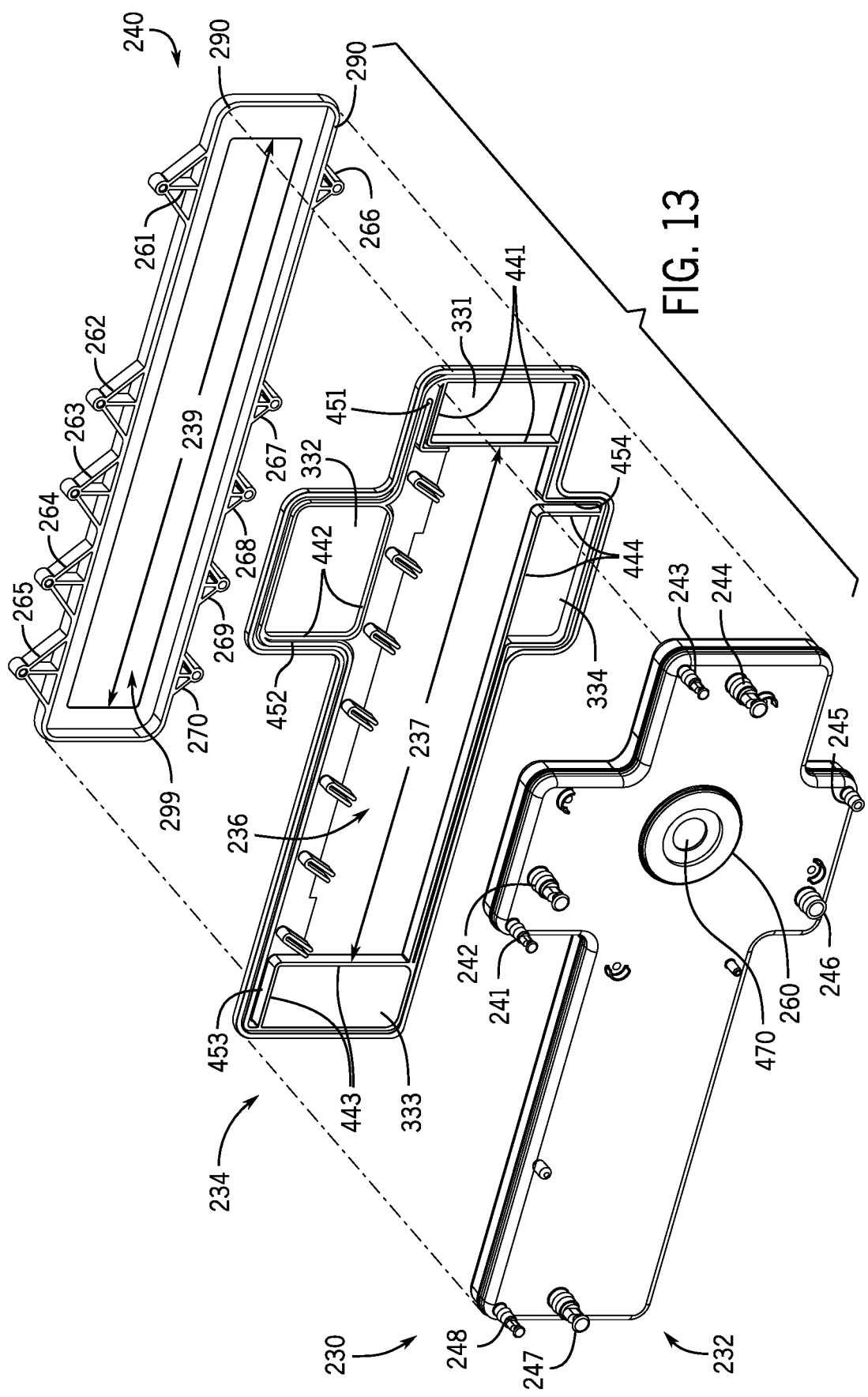
FIG. 13 is an exploded rear perspective view of the condensate pan and pocket of FIG. 12, in accordance with an aspect of the present disclosure.

FIG. 13 is an exploded rear perspective view of an embodiment of the drain pan 230 and the pocket 240 configured to collect and drain liquid condensate formed in or on a heat exchanger, such as the furnace 150 of FIG. 5. As discussed above with respect to FIGS. 6 and 9, the drain pan 230 may have one or more fluid chambers 331, 332, 333, and 334 which may be in fluid communication with recess 238 to allow for the movement and collection of liquid condensate into the one or more fluid chambers 331, 332, 333, and 334. Each fluid chamber 331, 332, 333, and 334 may be lined with a respective set of internal dividers 341, 342, 343, 344 (illustrated in FIG. 9) that extend from the internal surface of the first shell component 232. That is, fluid chamber 331 may have a set of internal dividers 341 (as illustrated in FIG. 9), fluid chamber 332 may have a set of internal dividers 342 (as illustrated in FIG. 9), fluid chamber 333 may have a set of internal dividers 343 (as illustrated in FIG. 9), and fluid chamber 334 may have a set of internal dividers 344 (as illustrated in FIG. 9), all of which extend from the interior surface of the first shell component 232.

As illustrated in FIG. 13, the chambers 331, 332, 333, and 333 may also be lined with a second respective set of dividers 441, 442, 443, and 444 that extend from the interior surface of the second shell component 234. The internal dividers 441, 442, 443, and 444 may be configured to contact the first shell component 232 to collect and trap liquid condensate into their respective fluid chambers 331, 332, 333, and 334 such that the condensate may be removed via one or more of the discharge ports 241, 242, 243, 244, 245, 246, 247, 248. Each set of internal dividers 441, 442, 443, and 444 may define a respective channel that allows for fluid communication between the recess 238 and the respective fluid chambers 331, 332, 333, and 334. That is, internal dividers 441 may define a channel 451 in fluid communication with fluid chamber 331, internal dividers 442 may define a channel 452 in fluid communication with fluid chamber 332, internal dividers 443 may define a channel 453 in fluid communication with fluid chamber 333, and internal dividers 444 may define a channel 454 in fluid communication with fluid chamber 334. The channels 451, 452, 453, and 454 may also be in fluid communication with the recess 238 thereby guiding liquid condensate from the recess 238 into one of the respective fluid chambers 331, 332, 333, and 334. For example, in the embodiment shown, liquid condensate may move through the heat exchange tubes (e.g., secondary tubes 164 illustrated in FIG. 5) and into the pocket 240.

In some embodiments, the internal dividers 441, 442, 443, and 444 may be receptacles defined by extensions that extend from the interior surface of the second shell component 234. That is, the receptacles that are defined by the dividers 441, 442, 443, and 444 and extend from the interior surface of the second shell component 234 may be configured to align with and receive the internal dividers 341, 342, 343, and 344 (illustrated in FIG. 9) that extend from the interior surface of the first shell component 232, thereby coupling the first and second shell components 232 and 234, and forming the fluid chambers 331, 332, 333, and 334.

Figure 14:
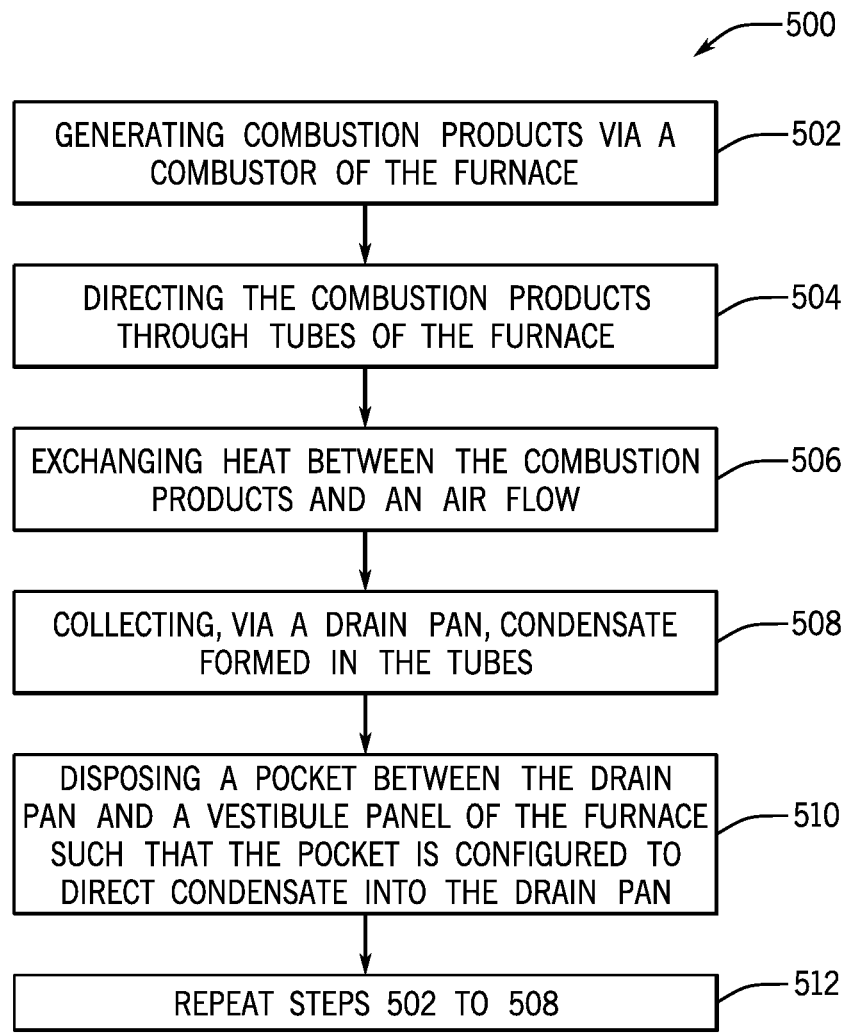
FIG. 14 is a process flow diagram illustrating a method of operating a furnace, in accordance with an aspect of the present disclosure.

FIG. 14 is a process flow diagram illustrating an embodiment of a method 500 of operating a furnace. For example, the method 500 includes generating (block 502) combustion products via a combustor of the furnace. As previously described, the furnace may include one or more combustors configured to ignite a mixture of fuel and oxidant, thereby generating combustion products.

Further, the method 500 includes directing (block 504) the combustion products through tubes of the furnace. As previously described, the furnace may include heat exchange tubes (e.g., a primary set of heat exchange tubes and a secondary set of heat exchange tubes fluidly coupled with the primary set of heat exchange tubes). The furnace may direct the combustion products to the primary set of heat exchange tubes, and the primary set of heat exchange tubes may direct the combustion products into a secondary set of heat exchange tubes.

Further, the method 500 includes exchanging (block 506) heat between the combustion products and an air flow. As previously described, the combustion products may flow within heat exchange tubes, such as a primary set of heat exchange tubes and a secondary set of heat exchange tubes fluidly coupled with the primary set of heat exchange tubes. An air flow may be biased over the heat exchange tubes such that the air flow extracts heat from the combustion products flowing through the heat exchange tubes.

Further, the method 500 includes collecting (block 508), via a drain pan, condensate formed in the tubes. As previously described, the heat exchange relationship described in block 506 may cause liquid condensate to form within the heat exchange tubes (e.g., the primary set of heat exchange tubes and/or the secondary set of heat exchange tubes). The heat exchange tubes may be fluidly coupled with a drain pan. For example, the secondary set of heat exchange tubes may be coupled to the drain pan adjacent a vestibule panel. Accordingly, condensate residing within the secondary set of heat exchange tubes may flow into, and be collected by, the drain pan. In some embodiments, the drain pan may be directly affixed to the vestibule panel.

Further, the method 500 includes disposing (block 510) a pocket between the drain pan and the vestibule panel of the furnace such that the pocket is configured to direct condensate into the drain pan. As previously described, the pocket may include a condensate collection opening (e.g., condensate collection mouth) having a larger cross-sectional area than a condensate collection opening (e.g., condensate collection mouth) in the drain pan. For example, the condensate collection opening in the pocket may include a length and a width. Further, the condensate collection opening in the drain pan may include a length and a width. The length of the condensate collection opening of the pocket may be greater than the length of the condensate collection opening of the drain pan, the width of the condensate collection opening of the pocket may be greater than the width of the condensate collection opening of the drain pan, or a combination thereof. In some embodiments, the pocket may be directly affixed to the vestibule panel and/or the drain pan. In some embodiments, the drain pan may be directly affixed to the vestibule panel and the pocket may be directly affixed to the drain pan. Other possible couplings between the drain pan, the pocket, and another component of the furnace (e.g., the vestibule panel) are also possible in accordance with the present disclosure.

Further, the method 500 includes, after disposing the pocket between the drain pan and the vestibule panel, repeating (block 512) blocks 502 to 508. For example, after the pocket is disposed between the drain pan and the vestibule panel, the furnace may be operated to generate combustion products, direct the combustion products through the heat exchange tubes of the furnace, exchange heat between the combustion products and an air flow biased over the tubes of the heat exchange tubes of the furnace, and collect condensate via the drain pan (e.g., the pocket may direct the condensate into the drain pan). The present disclosure may provide one or more technical effects useful in the operation of an HVAC system. For example, a heat exchanger, such as a furnace, may include a drain pan and a pocket extending between the drain pan and tubes of the furnace. The pocket may improve liquid condensate collection and drainage by improving a collection area and volume. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A furnace for a heating, ventilation, and/or air conditioning (HVAC) system, wherein the furnace comprises:
 a condensate pan, comprising:
  a first shell component; and
  a second shell component configured to be coupled to the first shell component, wherein the second shell component comprises a first opening defined in a surface of the second shell component, wherein the condensate pan is configured to receive liquid condensate via the first opening, and wherein the first opening comprises a first cross-sectional area; and
 a pocket comprising a wall circumscribing and defining a second opening, which has a second cross-sectional area greater than the first cross-sectional area of the first opening, wherein the pocket is configured to be coupled to the surface of the second shell component such that the wall of the pocket surrounds the first opening in the surface of the second shell component.

2. The furnace of claim 1, wherein the first opening comprises a first length and a first width, wherein the second opening comprises a second length and a second width, and wherein:
the first length is less than the second length or the first width is less than the second width.

3. The furnace of claim 1, wherein the first opening comprises a first length and a first width, wherein the second opening comprises a second length and a second width, wherein the first length is less than the second length, and wherein the first width is less than the second width.

4. The furnace of claim 1, comprising:
a vestibule panel;
a first pocket surface of the pocket, wherein the first pocket surface is configured to engage the vestibule panel;
a second pocket surface of the pocket opposite to the first pocket surface, wherein the second pocket surface is configured to engage the surface of the second shell component; and
the wall extending between the first pocket surface and the second pocket surface.

5. The furnace of claim 1, wherein the condensate pan comprises
a recess formed between the first shell component and the second shell component, wherein the recess is defined at least in part by the first opening, and the first opening defines an entry into the recess.

6. The furnace of claim 5, wherein the first shell component comprises a first inward facing surface, the second shell component comprises a second inward facing surface opposing the surface, a plurality of dividers extends from the first inward facing surface toward the second inward facing surface or from the second inward facing surface toward the first inward facing surface, and the plurality of dividers defines a plurality of fluid chambers between the first shell component and the second shell component.

7. The furnace of claim 6, wherein the plurality of fluid chambers is fluidly coupled to the recess.

8. The furnace of claim 6, wherein the condensate pan comprises a plurality of discharge ports fluidly coupled with the plurality of fluid chambers and configured to be:
closed to block the liquid condensate from being drained from the plurality of fluid chambers; and
opened to enable draining of the liquid condensate from the plurality of fluid chambers.

9. The furnace of claim 1, wherein the pocket comprises a plurality of tabs extending from an outer perimeter of the wall of the pocket, and wherein the pocket is configured to be coupled to the condensate pan at the plurality of tabs.

10. The furnace of claim 9, wherein the plurality of tabs of the pocket comprises a first plurality of posts, wherein the condensate pan comprises a second plurality of posts, and wherein the pocket is configured to be coupled to the condensate pan via a plurality of fasteners that engage the first plurality of posts and the second plurality of posts.

11. The furnace of claim 9, wherein each tab of the plurality of tabs comprises a triangular shape or a pentagonal shape.

12. A condensate collection assembly for a heating, ventilation, and/or air conditioning (HVAC) system, wherein the condensate collection assembly comprises:
a condensate pan, comprising:
a first shell component; and
a second shell component configured to be coupled to the first shell component, wherein the second shell component comprises a first opening defined in a surface of the second shell component, wherein the condensate pan is configured to receive liquid condensate via the first opening; and
a pocket comprising a wall circumscribing and defining a second opening configured to receive the liquid condensate, wherein the pocket is configured to be coupled to the surface of the second shell component such that the wall of the pocket surrounds the first opening in the surface of the second shell component and such that a portion of the surface of the second shell component extends between the wall of the pocket and the first opening defined in the surface of the second shell component.

13. The condensate collection assembly of claim 12, comprising a fastener configured to couple the pocket to the condensate pan.

14. The condensate collection assembly of claim 12, wherein the condensate pan comprises
a recess formed between the first shell component and the second shell component, wherein the recess is defined at least in part by the first opening and the first opening defines an entry into the recess.

15. The condensate collection assembly of claim 12, wherein the condensate pan comprises a plurality of internal dividers configured to define a plurality of fluid chambers, and wherein the plurality of fluid chambers is configured to receive the liquid condensate after the liquid condensate passes through the first opening and the second opening.

16. The condensate collection assembly of claim 12, wherein the pocket is configured to be disposed between the condensate pan and a vestibule panel of a furnace of the HVAC system.

17. The condensate collection assembly of claim 12, wherein the wall of the pocket extends longitudinally beyond the first opening defined in the surface of the second shell component such that the portion of the surface of the second shell component resides between a first width of the first opening and a second width of the second opening.

18. A heat exchanger for a heating, ventilation, and/or air conditioning (HVAC) system, the heat exchanger comprising:
a condensate pan having a first opening defined in a surface of the condensate pan, wherein the condensate pan is configured to receive liquid condensate associated with heat exchange tubes of the heat exchanger via the first opening, and wherein the first opening comprises a first cross-sectional area; and
a pocket extending from the surface of the condensate pan and comprising a wall defining a second opening configured to receive the liquid condensate and having a second cross-sectional area greater than the first cross-sectional area of the first opening, wherein the pocket and the condensate pan are positioned relative to each other such that the wall of the pocket surrounds the first opening in the surface of the condensate pan, wherein the pocket is configured to couple to the condensate pan such that the pocket is disposed between a panel of the heat exchanger and the condensate pan.

19. The heat exchanger of claim 18, comprising a plurality of heat exchange tubes configured to receive combustion products and fluidly coupled with the pocket and the condensate pan such that the pocket and the condensate pan receive the liquid condensate formed within the heat exchange tubes.

20. The heat exchanger of claim 18, wherein the pocket is integrally formed with the condensate pan.

\* \* \* \* \*